United States Patent [19]

Sakai

[11] 4,163,532
[45] Aug. 7, 1979

[54] TAPE SPEED CONTROL SERVOMECHANISM FOR A MAGNETIC TAPE CASSETTE APPARATUS

[75] Inventor: Yoshiaki Sakai, Musashino, Japan

[73] Assignee: Teac Corporation, Musashino, Japan

[21] Appl. No.: 869,243

[22] Filed: Jan. 13, 1978

[30] Foreign Application Priority Data

| Jan. 31, 1977 | [JP] | Japan | 52-9418 |
| Feb. 10, 1977 | [JP] | Japan | 52-13608 |
| Feb. 10, 1977 | [JP] | Japan | 52-13609 |
| Feb. 10, 1977 | [JP] | Japan | 52-13610 |
| Feb. 10, 1977 | [JP] | Japan | 52-13611 |
| Feb. 10, 1977 | [JP] | Japan | 52-13612 |
| Feb. 10, 1977 | [JP] | Japan | 52-13613 |

[51] Int. Cl.² .................................... G11B 15/32
[52] U.S. Cl. .................................... 242/186; 360/73
[58] Field of Search .............. 242/186, 191, 184; 360/71, 73, 96; 318/6, 7

[56] References Cited

U.S. PATENT DOCUMENTS

| 3,584,805 | 6/1971 | Lee | 242/184 |
| 3,600,654 | 8/1971 | Yasutake | 318/6 |
| 3,819,128 | 6/1974 | Hori et al. | 242/189 |
| 4,015,177 | 3/1977 | Vaz Martins | 318/7 |

FOREIGN PATENT DOCUMENTS 2407402  8/1974  Fed. Rep. of Germany ............ 360/73

*Primary Examiner*—Leonard D. Christian
*Attorney, Agent, or Firm*—Woodcock, Washburn, Kurtz & Mackiewicz

[57] ABSTRACT

A speed sensing roller is mounted in position on a digital tape cassette apparatus for frictional contact with a length of magnetic tape within a cassette housing through that one of the apertures in the cassette housing which is located closest to one of the cassette hubs operating as the takeup hub during tape travel in a forward direction. Utilizing a tape speed signal generated by a speed sensor driven by the speed sensing roller, a closed-loop servomechanism controls a pair of motors coupled directly to the respective cassette hubs to afford constant tape speed. The servomechanism is associated with a tape tension control circuit which causes controlled energization of a supply side one of the hub motors during tape travel in either direction in order to maintain proper tape tension. Various other circuit means are provided for optimum tape transportation in the digital tape cassette apparatus.

16 Claims, 21 Drawing Figures (A) TAPE RUN COMMAND SIGNAL
(B) OUTPUT FROM START CONTROL CIRCUIT 139
(C) ACTUAL TAPE SPEED

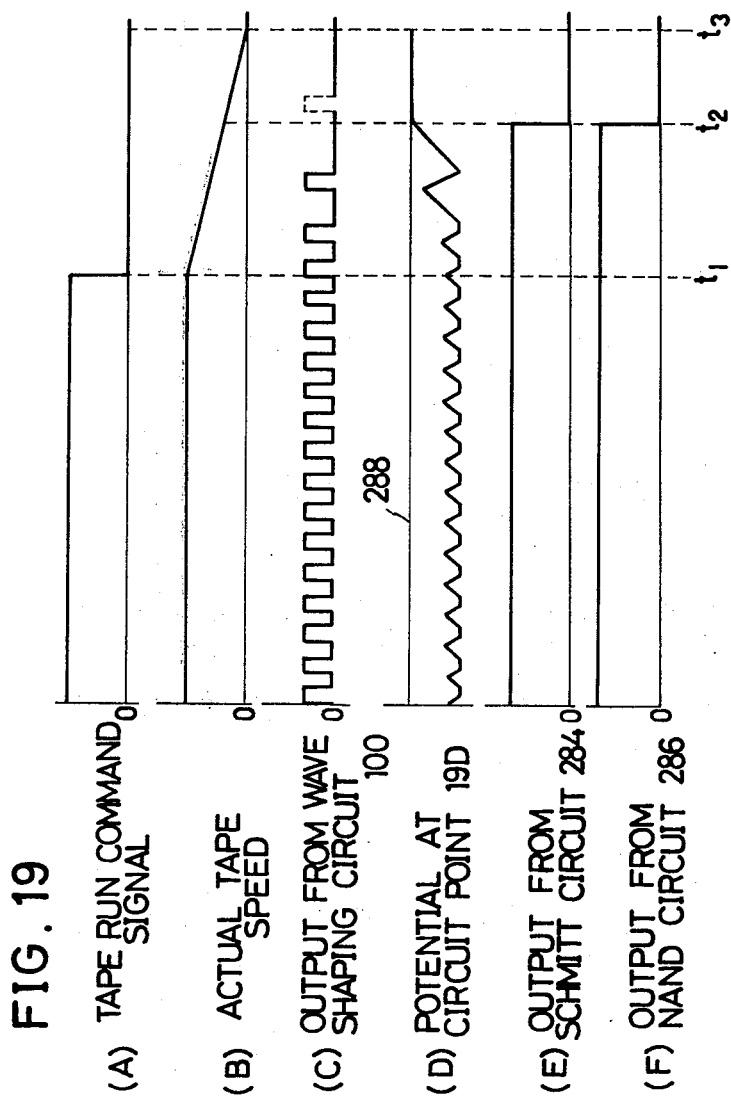

TAPE SPEED CONTROL SERVOMECHANISM FOR A MAGNETIC TAPE CASSETTE APPARATUS

BACKGROUND OF THE INVENTION

1. Field of the Invention

This invention relates to speed controls, to magnetic tape speed controls, and in particular to a magnetic tape transport including a speed control servomechanism. More particularly, the invention deals with such a tape transport and speed control system well adapted for use in a digital tape cassette apparatus.

2. Description of the Prior Art

Magnetic tape transports can be broadly classified into the capstan drive type and the reel or hub drive type. In the former type, the tape is transported from one reel to another by means of a motor-driven capstan pressing the tape against a cooperating pinch roller. In order to attain constant tape speed, therefore, the actual tape speed may be sensed from the rotative speed of the capstan itself, and the capstan drive motor may be controlled correspondingly for constant speed rotation. Although comparatively easy to afford tape transportation at substantially constant speed, the capstan drive causes considerable tape wear and the accumulation of static charges in the system. Additionally, the capstan drive necessitates the provision of many moving parts, and even with utmost care paid for proper adjustment of the capstan and pinch roller, the system cannot control tape speed as well as desired.

Such disadvantages are absent from the reel drive. With this latter system, however, the driving of the reels at constant speed results in varying tape speed depending upon the amounts of the tape wound on the two reels. In order to attain constant tape speed, therefore, the rotative speeds of the reel motors must be varied in accordance with the varying tape amounts on the reels, as by means of a servomechanism utilizing a signal representative of actual tape speed.

Of the various devices heretofore suggested and used for sensing actual tape speed, a typical example is found in U.S. Pat. No. 3,297,266 to Wilburn L. Rumple, which teaches the use of a "timing wheel" attached to or included in one of paired guide rollers defining a tape path from reel to reel on an open-reel tape transport. U.S. Pat. No. 3,600,654 to Katsuya Yasutake also teaches the use of one of the guide rollers for the generation of a tape speed signal. Nowhere in these patents is disclosed, however, how the speed sensing means can be applied to cassette tape transports.

In the case of an open-reel tape transport, as in the cited U.S. patents, the tape is in sufficient frictional contact with the guide rollers, so that the tape speed can be accurately ascertained from the guide roller rotation. Proper frictional contact of a speed sensing roller with the tape is far more difficult to realize in a tape transport for use with digital or audio tape cassettes of the internationally accepted Philips type. Even if the frictional contact is somehow established therebetween, moreover, magnetic tape cassette apparatus of the reel or hub drive type require additional considerations to be paid for optimum tape transportation.

SUMMARY OF THE INVENTION

It is an object of this invention to provide an improved tape transport and speed control system of the reel or hub drive type for use in a magnetic tape cassette apparatus, particularly that for the reading and/or writing of digital information.

Another object of the invention is to provide such a tape transport and speed control system which permits easy and accurate sensing of the actual speed of cassette tape for driving the cassette hubs at correspondingly modified or controlled speed.

Still another object of the invention is to provide a closed-loop, two-motor servomechanism for a magnetic tape cassette apparatus which permits controlled energization of the two cassette hub motors for driving the tape at constant speed and under constant tension.

With these and other objects in view, the present invention is directed to a magnetic tape cassette apparatus for use with a tape cassette of, typically, the universal Philips type having a length of magnetic tape which extends between a pair of hubs within a housing and which is partly exposed through a series of apertures in the front edge of the cassette housing. The apparatus has a magnetic head, such as a read/write head, arranged for relative sliding contact with the tape through a centrally located one of the apertures in the cassette housing.

The tape transport and speed control system in accordance with the invention includes variable speed motor means for driving the cassette hubs, the speed of which is determined by the magnitude of a control signal. A speed sensing roller is arranged for frictional contact with the cassette tape through another of the cassette housing apertures which is located substantially closest to one of the cassette hubs which operates as the takeup hub during tape travel in a predetermined forward direction. Driven by this speed sensing roller, speed sensor means generates an electrical output signal representative of actual tape speed. The system further includes servo circuit means for comparing the output signal of the speed sensor means with a reference signal and for delivering to the motor means the desired control signal corresponding to the difference therebetween.

It is clear from the foregoing that, during forward tape travel, the speed sensing roller is maintained in frictional contact with that portion of the tape extending tautly between the takeup side hub and the magnetic head urging the tape against the usual pad resiliently mounted behind the tape. The speed sensing roller is therefore capable of rotation at highly synchronous speed with the tape during its forward travel, as well as when the forward tape travel is just started up and being brought to a stop. The accurate measurement of actual tape speed is a prerequisite for the accurate servo control of the tape speed. As a further advantage, the speed sensing roller can be mounted in a position such that the desired frictional contact between roller and tape is established simply as the tape cassette is loaded in position on the apparatus.

The above arrangement of the speed sensing roller with respect to the tape cassette and the magnetic head results in the additional, rather unexpected advantage that as the magnetic head is located between the roller and the supply side cassette hub during forward tape travel, the roller performs the added function of, so to say, a pinch roller in the conventional capstan drive. The speed sensing roller thus serves to impart tension to the tape passing in sliding contact with the magnetic head, so that the reading and/or writing performance of the head can be improved.

Admittedly, the above recited advantages of accurate tape speed measurement and consequent control are gained only during forward tape travel. This presents no serious problem, however, because in digital tape cassette apparatus to which the invention is principally directed, reverse tape travel is effected only when the tape is rewound at high speed or when the tape is "backspaced" through, for example, its erroneously written data portion for rewriting or rereading.

For the best results, the speed sensing roller should be so positioned with respect to the tape cassette that the tape wil be wrapped around its circumferential portion of about 28 degrees. Generally speaking, the angle through which the speed sensing roller is maintained in circumferential contact with the tape can range from about 10 up to about 50 degrees. The contact angle of less than about 10 degrees would result in tape slippage and, therefore, in incorrect measurement of actual tape speed. The contact angle of more than about 50 degrees cannot possibly be attained in practice because of the very construction of the Philips type tape cassette. Preferably, the contact angle should be in the range of from about 20 to about 30 degrees.

Also for the best results, the moment of inertia possessed by the speed sensing roller should be about 0.15 g cm$^2$, although in practice it can range from about 0.01 to about 0.50 g cm$^2$. The speed sensing roller with a moment or inertia of less than about 0.01 g cm$^2$ is difficult of manufacture, and that with a moment of inertia of more than about 0.50 g cm$^2$ would place too much load on the tape and would not make smooth rotation at synchronous speed therewith.

In a preferred embodiment, the tape transport and speed control system comprises a closed-loop, two-motor servomechanism, with the two variable speed motors coupled to the respective cassette hubs for directly driving same. Means comprising a pair of switching transistors operates to cause direct delivery of the servo output signal to a takeup side one of the hub motors during tape travel in either direction. Closely associated with the servomechanism is a tape tension control circuit which causes a tape tension signal, substantially in inverse proportion to the servo output signal in magnitude, to be applied to a supply side one of the hub motors during tape travel in either direction. The two hub motors are thus energized in a controlled manner to cause either forward or reverse tape travel at constant speed and under constant tension.

The preferred tape transport and speed control system additionally comprises a feedback circuit capable of controllably varying the servo loop gain, braking circuits for bringing to a rapid stop the tape which has been in its forward or reverse travel, a minimum and a maximum servo voltage setting circuit for limiting the minimum and the maximum servo output voltage values, and so on, all well calculated to realize the general objective of optimum tape transportation in the digital tape cassette apparatus.

The above and other objects, features and advantages of this invention and the manner of attaining them will become more clearly apparent, and the invention itself will best be understood, from the following description and appended claims taken together with the accompanying drawings showing the preferred embodiments of the invention.

BRIEF DESCRIPTION OF THE DRAWINGS

FIG. 19 is a graphical diagram of various idealized waveforms useful in explaining the operation of the tape speed reduction sensing circuit of FIG. 18;

DESCRIPTION OF THE PREFERRED EMBODIMENTS

The tape transport and speed control system in accordance with this invention will hereinafter be described in detail as adapted for the digital tape cassette apparatus of the type disclosed in T. Haraguchi copending U.S. patent application Ser. No. 821,094, filed on Aug. 2, 1977 and assigned to the instant assignee. Before description of the apparatus, however, a typical tape cassette for use therewith will be briefly explained, the better to make clear the features and advantages of the invention.

Figure 1:
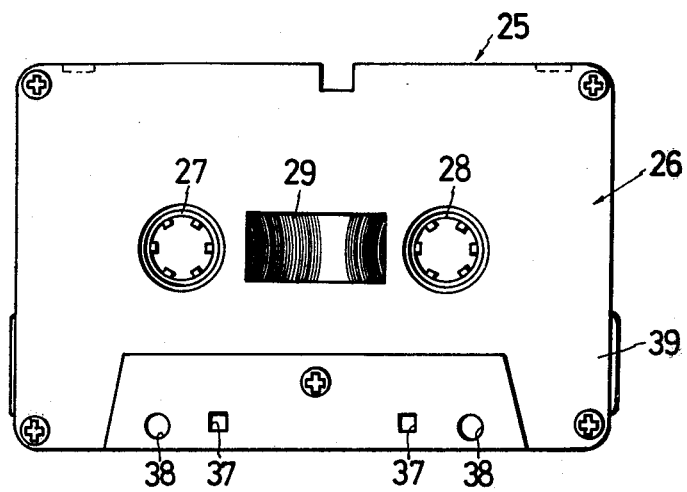
FIG. 1 is a plan view of a magnetic tape cassette for use with the apparatus in which there can be incorporated the tape transport and speed control system of this invention.
Figure 2:
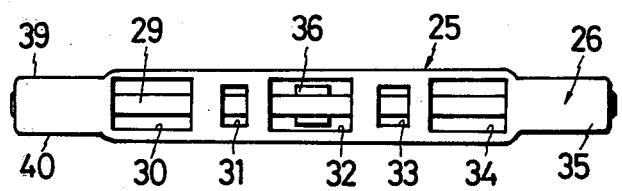
FIG. 2 is a front elevational view of the tape cassette of FIG. 1.

With reference first to FIGS. 1 and 2, therefore, it will be seen that the magnetic tape cassette illustrated therein and generally designated 25 is of the known Philips type having a relatively flat, box-like housing 26 within which paired first and second hubs or reels 27 and 28 are supported for independent rotation about spaced parallel axes. A length of magnetic tape 29 is wound at least in part on the two hubs 27 and 28 and has its extremities secured respectively thereto.

The cassette housing 26 has a series of apertures 30, 31, 32, 33 and 34 formed in its front edge 35 to partly expose the magnetic tape 29 as the latter passes between the first and the second hubs 27 and 28 along a predetermined path within the housing 26. The apertures 30 and 34 seen at the extreme left and right in FIG. 2 are intended to permit intrusion of a pinch roller of the conventional capstan drive, although these apertures are utilized for a completely different purpose in the digital tape cassette apparatus hereinafter described. The centrally located aperture 32 is intended to permit intrusion of a magnetic head for reading and/or writing. The apertures 31 and 33 are intended for use, for example, in optically sensing the begining and end of the magnetic tape 29.

It will also be noted from FIG. 2 that a pad 36 is provided behind the tape portion passing the central aperture 32. Mounted on a resilient support, not shown, the pad 36 is intended to afford proper sliding contact of the magnetic tape 29 with the magnetic head.

Additionally, the cassette housing 26 has a pair of openings or holes 37 and another pair of holes 38 formed in its face 39, as shown in FIG. 1, so as to be in alignment with corresponding pairs of openings and holes formed in the opposite face 40. The pairs of openings 37 are intended for the insertion of guide pins hereinafter set forth, and the pairs of holes 38 are intended for the insertion of a capstan of the prior art capstan drive.

Figure 3:
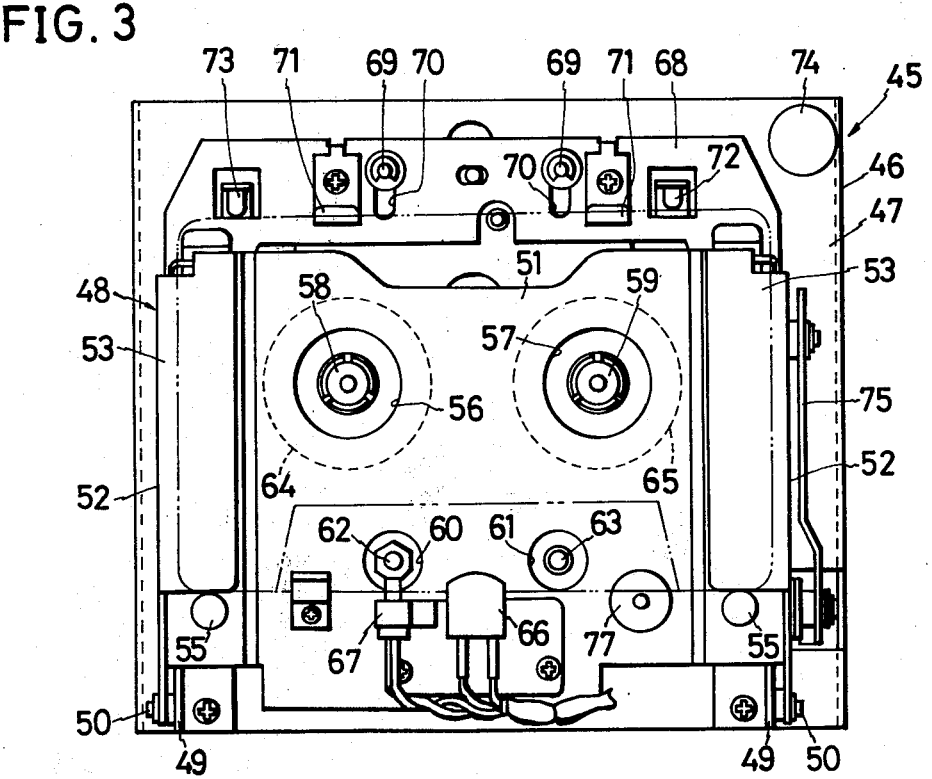
FIG. 3 is a top plan view of the apparatus, for use with the tape cassette of FIGS. 1 and 2, incorporating the tape transport and speed control system of the invention, the view showing the apparatus with the top cover (not shown in FIG. 3) of its cassette cradle removed to reveal other parts.
Figure 4:
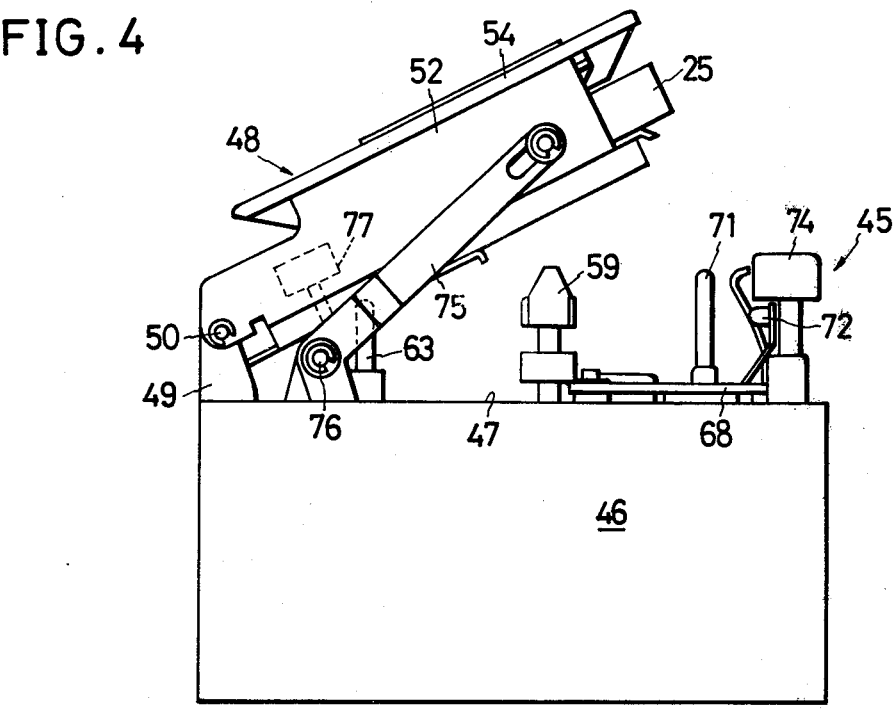
FIG. 4 is the right hand side elevational view of the tape cassette apparatus of FIG. 3, the view showing the apparatus with its cassette cradle, carrying the tape cassette of FIGS. 1 and 2, in the loading position and with its carriage in the retracted position.
Figure 5:
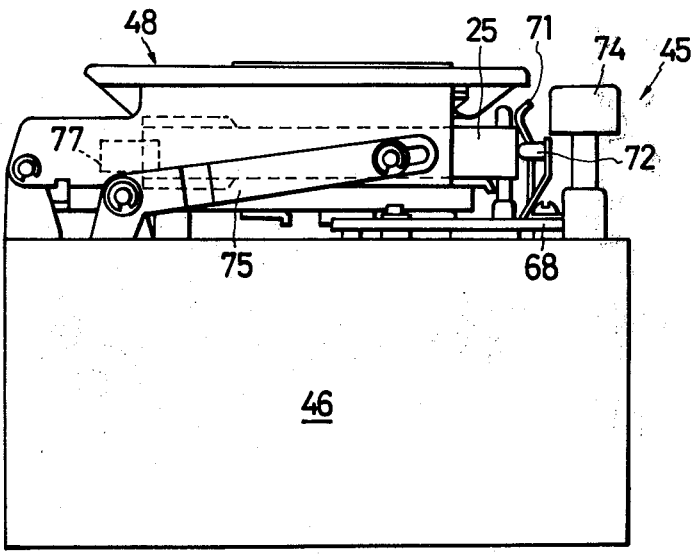
FIG. 5 is a view similar to FIG. 4 except that the loaded casette cradle is shown in the read/write position and the carriage in the operating position.

FIGS. 3, 4 and 5 are meant to illustrate the mechanical construction of the digital tape cassette apparatus insofar as is necessary for a full understanding of the present invention. Generally designated 45, the tape cassette apparatus includes a casing 46 having a top wall 47 on which there is hingedly mounted a cassette cradle 48 defining a cavity for receiving and holding the tape cassette 25 of FIGS. 1 and 2.

The hinge mounting for the cassette cradle 48 comprises a pair of hinge brackets 49 fixedly mounted on the casing top wall 47 adjacent to its front edge, and a pair of coaxially oriented hinge pins 50 coupling the hinge brackets to the cassette cradle. The cassette cradle 48 is therefore pivotable with respect to the casing 46 between a loading position of FIG. 4, where the tape cassette 25 is to be loaded into and unloaded from the cradle, and a read/write position of FIG. 5, where the magnetic tape 29 within the cassette is to be run at controlled speed for desired tape processing operation such as reading or writing.

The cassette cradle 48 has a bottom wall 51 which is oriented parallel to the top wall 47 of the casing 46 when the cradle is in the read/write position as shown in FIG. 5. Also included in the cassette cradle 48 are a pair of confronting side walls 52 formed uprightly on both lateral edges of the bottom wall 51, and a pair of coplanar top walls 53 of comparatively small width extending toward each other from the top edges of the side walls. Additionally, the cassette cradle 48 has a top cover, shown in FIGS. 4 and 5 but not in FIG. 3, that is secured to its top walls 53. The cassette cradle 48 thus defines the desired cavity for holding the tape cassette 25.

Fixedly mounted on the bottom wall 51 of the cassette cradle 48, in the adjacency of its hinged end and of the side walls 52, are a pair of cassette stop pins 55 for positioning the tape cassette 25 within the cradle 48 with respect to its front-to-rear direction. The tape cassette 25 can thus be positioned within the cradle 48 simply as the cassette is inserted, with its apertured front edge 35 foremost, into the cradle through its rear, free end until the cassette makes abutting engagement with the stop pins 55, as indicated by the dot-and-dash lines in FIG. 3. A pair of leaf spring, not seen in the drawings, are mounted on the inner or lower surfaces of the cradle top walls 53, respectively, for urging the tape cassette 25 against the cradle bottom wall 51.

The cradle bottom wall 51 has formed therein a pair of circular openings 56 and 57 to permit first and second spindles 58 and 59 to project upwardly therethrough, and another pair of smaller diameter openings 60 and 61 to permit a pair of guide pins 62 and 63 to project upwardly therethrough. Coupled directly to first and second variable speed electric motors 64 and 65 within the casing 46, the first and the second spindles 58 and 59 have each a plurality of angularly spaced keys or teeth formed thereon for positive engagement with the first and the second internally toothed hubs 27 and 28 of the tape cassette 25. The paired guide pins 62 and 63 are secured to the casing top wall 47 for engagement in the aligned openings 37 in the cassette housing 26, when the loaded cassette cradle 48 is pivoted from the loading to the read/write position, in order to maintain the tape cassette 25 in a predetermined position within the cradle. The guide pin 62 serves the additional purpose of holding a light source.

On the cradle bottom wall 51, at or adjacent its hinged front end, there is fixedly mounted a tape processing station which is shown to comprise a magnetic head 66 and a photodetector 67. It may be noted that the tape cassette apparatus 45 has no mechanism for shifting the position of the tape processing station, nor does the apparatus have the capstan or pinch roller found in most cassette players or decks.

The magnetic head 66 is positioned on the cradle bottom wall 51 so as to make sliding contact with the magnetic tape 29 within the cassette housing 26 through its front edge aperture 32 when the tape cassette 25 is inserted fully into the cradle 48. Disposed opposite to the light source supported by the guide pin 62, the photodetector 67 also partly intrudes into the tape cassette through its aperture 31 upon full insertion of the cassette into the cradle. The photodetector and the light source constitute parts of a conventional tape position sensing mechanism.

The tape cassette apparatus 45 further comprises a carriage 68 mounted on the casing top wall 47. This carriage is movable between an operating position of FIGS. 3 and 5, which is close to the free end of the cassette cradle 48 in the read/write position, and a retracted position of FIG. 4, remote from the free end of the cradle, in timed relation to the movement of the cradle between the read/write and the loading positions. Such movement of the carriage 68 between the operating and the retracted positions is guided by a pair of guide pins 69 planted on the casing top wall 47 and slidably engaged in a corresponding pair of guide grooves 70 formed in the carriage.

Mounted on the carriage 68 are a pair of cassette retainer cantilever springs 71 and first and second electrical switch assemblies 72 and 73. The cassette retainer springs 71 are intended to urge the tape cassette 25 within the cradle 48 against the stop pins 55 when the carriage is in the operating position and the cradle in the read/write position. The first switch assembly 72 is for detecting the tape cassette 25 loaded in the cradle 48, and the second switch assembly 73 for detecting one of the usual pair of breakable pawls provided to the cassette in order to prevent accidental or undesired erasure of a recording on the magnetic tape 29.

For moving the carriage 68 between the operating and the retracted positions, there is provided a carriage shift mechanism which is mounted within the casing 46 and which therefore is not seen in FIGS. 3, 4 and 5. This carriage shift mechanism operates to move the carriage 68 from the operating to the retracted position upon depression of a cassette ejector/carriage retractor pushbutton 74 on the casing top wall 47, and to move the carriage from the retracted back to the operating position as the cassette cradle 48 is manually pivoted from the loading to the read/write position.

The carriage shift mechanism is structurally and operatively associated with an ejector mechanism including an ejector bell crank 75 which is pivoted at 76 on the casing top wall 47 and which is operatively connected at one end to one of the side walls 52 of the cassette cradle 48. Loosely connected to the carriage shift mechanism within the casing 46, the ejector mechanism does not respond immediately to the depression of the cassette ejector/carriage retractor pushbutton 74, but with some delay. Upon depression of this pushbutton, therefore, the cassette cradle 48 starts pivoting from the read/write toward the loading position slightly after the carriage 68 starts travelling from the operating toward the retracted position. Likewise, when the cassette cradle is manually pivoted back from the loading to the read/write position, the carriage returns from the retracted to the operating position with some delay.

Upon pivotal movement of the loaded cassette cradle 48 to the read/write position of FIGS. 3 and 5, the first and the second spindles 58 and 59 are admitted into the cradle and further into the first and the second hubs 27 and 28 of the tape cassette 25 for positive engagement therewith. The pair of guide pins 62 and 63 are likewise admitted into the openings 37 in the cassette housing 26 thereby camming the tape cassette into relative position with respect to the magnetic head 66 and so forth.

The carriage 68 reaches its operating position slightly after the cassette cradle 48 reaches the read/write position, as mentioned previously. With the carriage thus moved to the operating position, the paired cassette retainer springs 71 thereon functions to urge the tape cassette 25 against the paired stop pins 55 and hence to stably maintain the cassette in position within the cradle during the subsequent reading or writing operation. For further details on the mechanical construction of this tape cassette apparatus 45, reference is directed to the aforementioned T. Haraguchi U.S. patent application Ser. No. 821.094.

Figure 6:
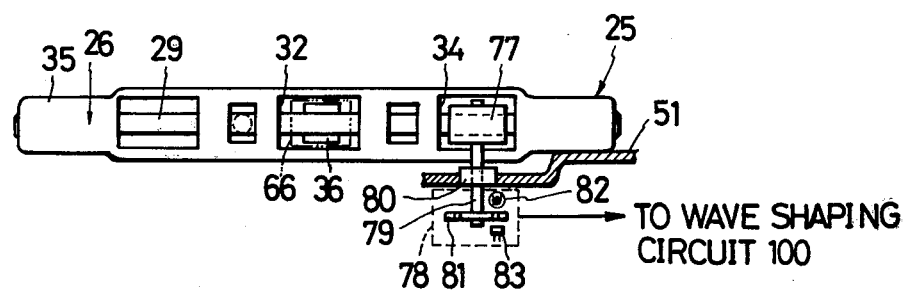
FIG. 6 is a view similar to FIG. 2 except that the tape cassette is shown together with the speed sensing roller and associated speed sensor for photoelectrically generating an electrical signal representative of actual tape speed.

As shown in FIG. 3 and in greater detail in FIG. 6, the tape transport and speed control system in accordance with the invention includes a tape speed sensing roller 77 connected to and driving a tape speed sensor 78. The speed sensing roller 77 is fixedly mounted on a shaft 79 which is rotatably supported by a bearing 80 on the bottom wall 51 of the cassette cradle 48. The speed sensing roller 77 is so positioned on the cradle bottom wall 51 as to make frictional contact with the magnetic tape 29 within the cassette housing 26 through the aperture 34 at the extreme right of its front edge 35 when the tape cassette 25 is inserted fully into the cradle 48. This aperture 34 is located substantially closest to the second cassette hub 28.

For the best results, the speed sensing roller 77 should be fabricated from rubber having a high coefficient of friction, with a diameter of 10.7 mm and a moment of inertia as low as 0.15 g cm$^2$. The moment of inertia of the speed sensing roller 77 can usually be in the range of from about 0.01 to about 0.50 g cm$^2$.

The roller shaft 79 extends downwardly through the cradle bottom wall 51, and on the lower end of this roller shaft there is fixedly mounted a rotary disc 81 forming a part of the speed sensor 78. This speed sensor additionally comprises a light source 82 supported above the rotary disc 81 in fixed relationship to the cassette cradle 25, and a suitable photoelectric element 83 fixedly supported under the rotary disc in a position of register with the light source 82. The rotary disc 81 has formed therein a multiplicity of angularly spaced slits to permit the passage therethrough of a light beam from the source 82 to the photoelectric element 83, the latter thereby generating an electrical signal having a frequency representative of actual tape speed.

The illustrated configuration of the speed sensor 78 is purely by way of example, however, and is subject to a variety of substitutions. For instance, there may be employed a tachometer which generates a voltage representative of actual tape speed or a magnetoelectric converter capable of generating a pulse train with a recurrence rate representative of actual tape speed.

Figure 7:
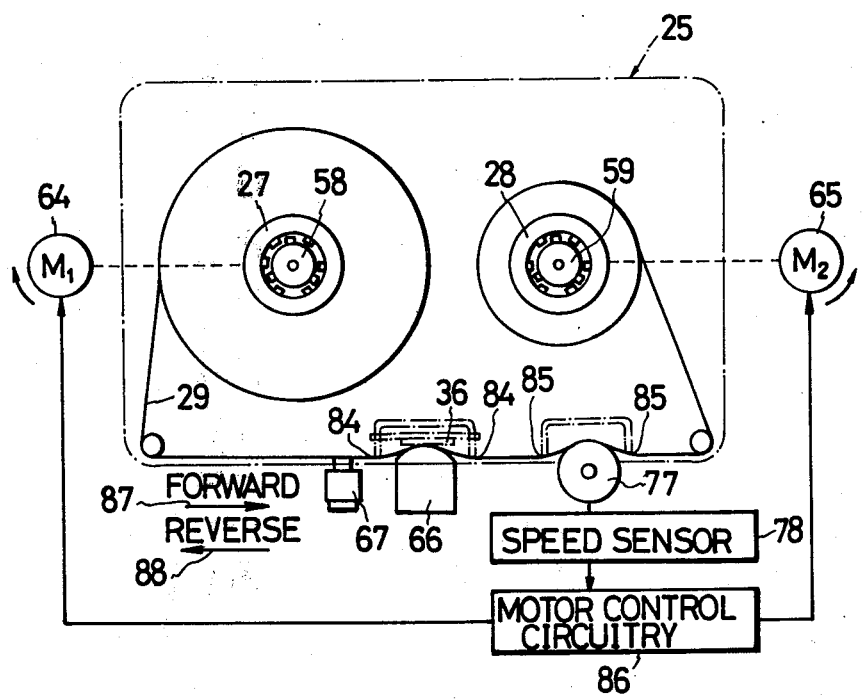
FIG. 7 is a schematic top plan view explanatory of the positional relationship between the tape cassette mounted in position on the apparatus of FIGS. 3 through 5 and the speed sensing roller, the magnetic head, etc., of the apparatus, the view being also explanatory of the way the pair of hub motors of the apparatus are controlled by utilizing the tape speed signal generated by the speed sensor.

With reference to FIG. 7, both magnetic head 66 and speed sensing roller 77 partly intrude into the cassette housing 26 through its front edge apertures 32 and 34 upon full insertion of the tape cassette 25 into the cradle 48. The magnetic head 66 intrudes into the cassette housing to such an extent that the magnetic tape 29 is thereby urged against the pad 36 for proper sliding contact with the head. The speed sensing roller 77 intrudes to such an extent that the magnetic tape is wrapped around its circumference through an angle of, for example, 28 degrees.

The angles through which the magnetic tape 29 is wrapped around the magnetic head 66 and the speed sensing roller 77 depend on the degrees of their intrusion into the cassette housing 26 and on the relative positions of lateral edges 84 and 85 bounding the apertures 32 and 34. Generally, the speed sensing roller 77 should have its circumferential portion of from about 10 to about 50 degrees, preferably from about 20 to about 30 degrees, held in frictional contact with the tape for proper synchronous rotation therewith. The above described arrangement of the speed sensing roller 77 with respect to the tape cassette 25 as well as the magnetic head 66 is an important feature of the cassette tape transport and speed control system of this invention.

The output of the speed sensor 78 is electrically connected to motor control circuitry given in block form in FIG. 7 and therein labelled 86, by which the first and the second hub motors 64 and 65 are to be energized in a manner to cause tape transportation at controlled speed and under controlled tension. For tape travel in a forward direction, as indicated by the arrow 87 in FIG. 7, the second hub motor 65 is to be driven in a counterclockwise direction, as viewed in FIG. 7, while the first hub motor 64 is being energized in a clockwise direction to impart tension to the magnetic tape 29 as same travels from the first 27 to the second 28 hubs.

For tape travel in a reverse direction, as indicated by the arrow 88 in FIG. 7, the first hub motor 64 is to be driven in the clockwise direction, while the second hub motor 65 is being energized in the counterclockwise direction to impart tension to the tape. During such tape travel in either direction, the speed sensing roller 77 is rotated at synchronous speed therewith, causing the speed sensor 78 to generate an electrical signal representative of the actual tape speed.

Figure 8:
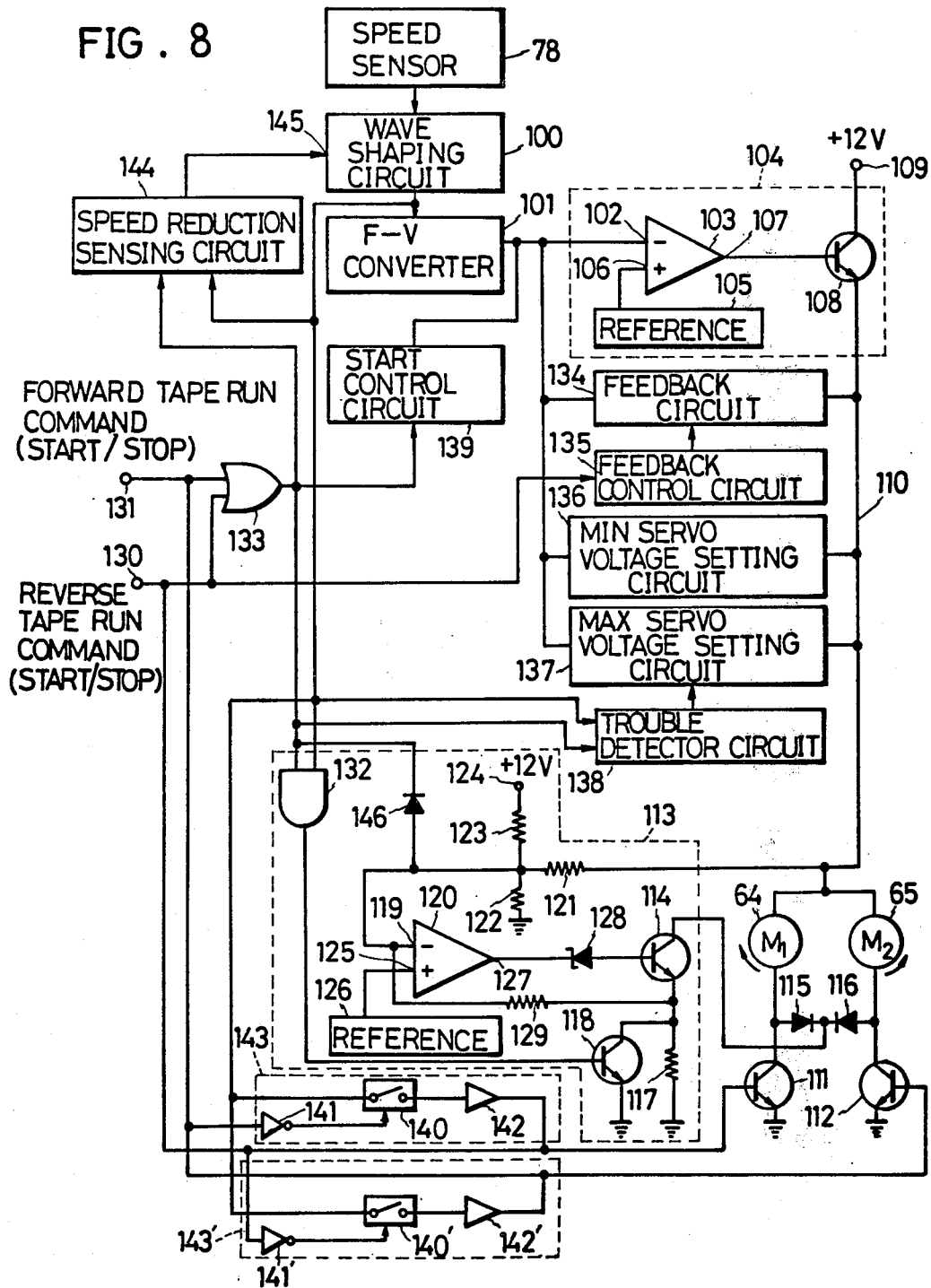
FIG. 8 is a combined block and schematic electrical diagram of motor control circuitry, incorporated in the tape cassette apparatus of FIGS. 3 through 5, that embodies the principles of the tape transport and speed control system of the invention.

FIG. 8 is a diagram showing the general organization of the motor control circuitry 86 which, in essence, is a closed-loop, two-motor servomechanism. Included in this circuitry is a wave shaping circuit 100 to the input of which is connected the speed sensor 78 and by which the speed sensor output signal, having a frequency representative of actual tape speed, is modified into a corresponding rectangular pulse train. The output of the wave shaping circuit 100 is connected to a frequency-to-voltage converter 101, which converts into a voltage signal the shaping circuit output signal having a frequency or recurrence rate representative of the actual tape speed. The converter output voltage of course represents the actual tape speed.

The output of the converter 101 is connected to the inverting input 102 of a differential amplifier 103 which is composed of a conventional operational amplifier and which is shown to be included in a servo amplifier circuit 104. A reference voltage circuit 105 is connected to the non-inverting input 106 of the differential amplifier 103 to supply thereto a reference voltage representative of desired tape speed. Consequently, the output 107 of this differential amplifier provides a voltage which, when the converter output voltage being supplied to its inverting input 102 becomes greater than the reference voltage being supplied to its non-inverting input 106, drops in accordance with the difference between the two input voltages. On the other hand, when the converter output voltage becomes less than the reference voltage, the differential amplifier output voltage rises in accordance with the difference therebetween.

The output 107 of the differential amplifier 103 is connected to the base of an amplifying NPN transistor 108. The collector of this transistor is connected to a +12 volt supply terminal 109, and its emitter is connected via a line 110 to the first and the second hub motors 64 and 65 in parallel with each other. The collector-emitter resistance of this amplifying transistor 108 increases in step with the increase in the output voltage of the converter 101 and decreases in step with the decrease in the converter output voltage.

As will be evident from the foregoing, the closed-loop, two-motor servomechanism is provided which comprises the speed sensor 78 together with the speed sensing roller 77, the wave shaping circuit 100, the frequency-to-voltage converter 101, the servo amplifier circuit 104, the first and the second hub motors 64 and 65, and the magnetic tape 29 extending between the first and the second cassette hubs 27 and 28 driven by the respective motors. The first and the second hub motors 64 and 65 are to be energized by the variable servo output voltage supplied through the line 110, hereinafter referred to as the servo output line, in order to effect tape transportation at controlled speed and under controlled tension.

It will also be seen that the servo amplifier circuit 104 comprising the differential amplifier 103, the reference voltage circuit 105 and the amplifying transistor 108 serves the dual purpose of input voltage comparison and the amplification of the resultantly obtained difference or error signal, in addition to the ultimate purpose of motor speed control. In FIG. 8, however, the servo amplifier circuit 104 is shown in greatly simplified form to facilitate understanding and is to be described later in more detail with reference to FIG. 13.

Connected between the emitter of the amplifying transistor 108 and ground are a series connection of the first hub motor 64 and a first switching NPN transistor 111 and, in parallel relationship therewith, another series connection of the second hub motor 65 and a second switching NPN transistor 112. The first and the second switching transistors 111 and 112 constitute the driving circuits of the first and the second hub motors 64 and 65, respectively, and have their emitters grounded.

The reference numeral 113 generally designates a tape tension control circuit for applying a "tape tension" voltage derived from the servo output voltage, to a supply side one of the hub motors 64 and 65 during tape travel in either direction and hence for maintaining the travelling magnetic tape 29 under controlled tension. This tape tension control circuit includes an NPN transistor 114, hereinafter referred to as the first tension control transistor, that has its collector connected to the first and the second hub motors 64 and 65 via first and second diodes 115 and 116, respectively. In other words, the hub motors are connected to the collector of the first tension control transistor 114 via the OR circuit composed of the diodes 115 and 116. The emitter of the first tension control transistor 114 is grounded via a resistor 117.

The tape tension control circuit 113 includes another NPN transistor 118, hereinafter referred to as the second tension control transistor, that is connected in parallel with the resistor 117, by having its collector connected to the emitter of the first tension control transistor 114 and its emitter grounded. During tape travel in either direction, the second tension control transistor 118 is to be intermittently rendered conductive in order to periodically vary the tape tension voltage applied to the supply side hub motor 64 or 65. The reason for this will be explained later.

Besides being connected to the hub motors 64 and 65, the servo output line 110 is connected directly to the inverting input 119 of a differential amplifier 120, which is included in the tape tension control circuit 113, via a resistor 121. Another resistor 122 is connected between one of the extremities of the resistor 121 and the ground, and still another resistor 123 is connected between the one extremity of the resistor 121 and a +12 volt supply terminal 124.

The differential amplifier 120, composed of a conventional operational amplifier, has its non-inverting input 125 connected to a reference voltage circuit 126. The differential amplifier 120 therefore effects analog comparison of the reference voltage from the reference voltage circuit 126 and the servo output voltage from the servo ammplifier circuit 104, producing an output voltage corresponding to the difference between the two input voltages. The output 127 of this differential amplifier is connected via a zener diode 128 to the base of the aforesaid first tension control transistor 114. A feedback resistor 129 is connected between the emitter of the first tension control transistor 114 and the inverting input 119 of the differential amplifier 120.

Thus, upon increase in the servo output voltage on the line 110, the output voltage of the differential amplifier 120 decreases, resulting in a decrease in the base current of the first tension control transistor 114 and in an increase in its collector-emitter resistance. Upon decrease in the servo output voltage, on the other hand, the output voltage of the differential amplifier 120 increases, resulting in an increase in the base current of the first tension control transistor 114 and in a decrease in its collector-emitter resistance. As a consequence, the tape tension voltage substantially in inverse proportion to the servo output voltage is applied to a supply side one of the hub motors 64 and 65 during tape travel in either direction, as will become more apparent as the description proceeds.

The first switching transistor 111 has its base connected to a reverse tape run command terminal 130. The second switching transistor 112 has its base connected to a forward tape run command terminal 131. The reverse and the forward tape run command signals input through the respective terminals 130 and 131 are each of binary nature, consisting of a high level tape run start command and a low level tape run stop command. Thus, upon inputting of the high level reverse tape run start command through the terminal 130, for example, the first switching transistor 111 is rendered conductive. The conduction of this first switching transistor is thereafter maintained until the low level reverse tape run stop command is input through the same terminal.

Let it now be assumed that the high level forward tape run start command is input through the terminal 131 to initiate conduction through the second switching transistor 112. The servo output voltage on the line 110 is then applied to the second hub motor 65 to cause its rotation as the takeup side motor at controlled speed such that the tape will travel forwardly at constant speed. During the conduction of the second switching transistor 112, the second diode 116 is held nonconductive to disconnect the tape tension control circuit 113 from the second hub motor 65.

Since the first switching transistor 111 connected to the reverse tape run command terminal 130 is now nonconductive, the first diode 115 is conductive to complete a circuit comprising the servo output line 111, the first hub motor 64, the first diode 115, the first tension control transistor 114, and the resistor 117 or the second tension control transistor 118. The first hub motor 64, now operating as the supply side motor, is therefore energized with the tape tension voltage under the control of the tape tension control circuit 113. As mentioned, this tape tension voltage is substantially in inverse proportion to the servo output voltage and is effective to maintain the forwardly travelling tape under constant tension.

Upon inputting of the high level reverse tape run start command through the terminal 130, on the other hand, the first switching transistor 111 is rendered conductive, whereas the second switching transistor 112 remains nonconductive. Disconnected from the tape tension control circuit 113 by the first diode 115, the first hub motor 64 is then energized with the servo output voltage on the line 111, thereby operating as the takeup side motor to cause reverse tape travel at constant speed.

Also, during this reverse tape travel, a circuit is formed which comprises the servo output line 110, the second hub motor 65, the diode 116, the first tension control transistor 114, and the resistor 117 or the second tension control transistor 118. The second hub motor 65, now operating as the supply side motor, is energized with the tape tension voltage under the control of the tape tension control circuit 113 in order to maintain the tape under constant tension.

The tape tension control circuit 113 additionally comprises an AND gate 132 having its output connected to the base of the second tension control transistor 118. One of the two inputs of this AND gate is connected to the wave shaping circuit 100, and the other input is connected to an OR gate 133 which has its two inputs connected to the reverse and the forward tape run command terminals 130 and 131. Thus, in response to the forward or reverse tape run start command, the AND gate 132 operates to deliver the output pulses of the wave shaping circuit 100 to the base of the second tension control transistor 118. This second tension control transistor is therefore maintained in intermittent conduction during tape travel in either direction.

Figure 20:
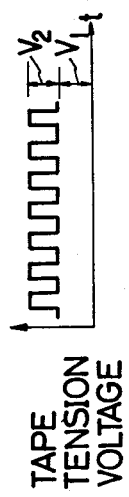
FIG. 20 is a graphical representation of the tape tension voltage applied by the tape tension control circuit of FIG. 8 to a supply side one of the hub motors during tape travel in either direction.

During each conducting period of the second tension control transistor 118, the resistor 117 connected in parallel therewith is short circuited, withr the consequent increase in the tape tension voltage applied to the supply side one of the hub motors 64 and 65. As will be seen from the waveform diagram of FIG. 20, therefore, the tape tension voltage applied to the supply side hub motor is composed of the continuous voltage component V1 under the control of the first tension control transistor 114 and the intermittent voltage component V2 under the control of the second tension control transistor 118. The frequency of this pulsating tape tension voltage is of the order of kilohertz or tens of kilohertz.

The above explained tape tension voltage, with its high frequency pulsating component, is effective to improve the instantaneous speed variation (ISV) of the tape, being capable of reducing the tape ISV, which has heretofore been about b 5 percent, to about 2.5 percent. The reason for this is not necessarily clear. One possible explanation, however, is that the magnitude of the resistor 117 can be made comparatively high owing to the presence of the intermittently conducting second tension control transistor 118 connected in parallel therewith, resulting in the stabilized operation of the complete tape tension control circuit 113.

A feedback circuit 134 is connected between the servo output line 110 and the inverting input 102 of the differential amplifier 103 for the stabilized operation of the servomechanism. This feedback circuit is of the integrator type, as will be later described in more detail.

Connected to an additional input of the feedback circuit 134 is a feedback control circuit 135 which is intended to make the gain of the servo loop less during reverse tape travel than during forward tape travel. The input of the feedback control circuit 135 is connected to the reverse tape run command terminal 130. In response to the reverse tape run start command, the feedback control circuit 135 functions to reduce the resistance of the feedback circuit 134, thereby lessening the servo loop gain during reverse tape travel. It is possible in this manner to afford substantially stable operation of the servomechanism during reverse tape travel even though the actual tape speed may not then be sensed as accurately as during forward tape travel because of the poorer frictional contact of the speed sensing roller 27 with the magnetic tape 29.

A minimum servo voltage setting circuit 136 is connected between the servo output line 110 and the inverting input 102 of the differential amplifier 103 in order to prevent the servo output voltage from dropping below a prescribed minimum magnitude. In this particular embodiment, the minimum servo voltage setting circuit 136 is configured to become conductive when the potential on the servo output line 110 becomes less than the potential on the differential amplifier input 102. Thus, in the event of a decrease in the servo output voltage for some reason or other, this decreased voltage is fed back to the differential amplifier input 102 to increase the amplifier output voltage and the servo output voltage.

The provision of the minimum servo voltage setting circuit 136 is desirable in the tape transport and speed control system of this invention wherein the takeup side hub motor is energized with the servo output voltage and the supply side hub motor with the tape tension voltage substantially in inverse proportion to the servo output voltage. Were it not for this minimum servo voltage setting circuit, the servomechanism might oscillate or "hunt", possibly resulting in the breakage of the magnetic tape 29. Such hunting of the servomechanism would take place as a result of the combination of causes such as: (1) an undue decrease in the servo output voltage due to high tape speed immediately after starting; (2) improper contact of the speed sensing roller 77 with the magnetic tape 29 due to the presence of a lapped seam or the like in the tape; and (3) the use of hub motors of excessively high torque output, requiring low input voltages.

In order for the minimum servo voltage setting circuit 136 to perform its intended functions to the full, the minimum magnitude of the servo output voltage should be set at a value to which the servo output voltage will not drop while the magnetic tape 29 is travelling at more or less normal speed. The minimum servo voltage setting should, nevertheless, be sufficiently high to enable the minimum servo voltage setting circuit 136 to prevent any critical hunting of the servomechanism. If the minimum servo voltage setting were too high, however, then the servomechanism would not operate in the intended manner and would cause the tape to run at more than desired speed. The illustrated minimum servo voltage setting circuit 136, which takes the form of a feedback circuit, is by way of example only and is susceptible to a variety of modifications within the usual knowledge of the specialists.

A maximum servo voltage setting circuit 137 is likewise connected between the servo output line 110 and the inverting input 102 of the differential amplifier 103 in order to prevent the servo output voltage from exceeding a prescribed maximum magnitude. The maximum servo voltage setting circuit 137 has an additional input connected to a trouble detector circuit 138. When this trouble detector circuit detects a trouble, causing an undue increase in the servo output voltage, the maximum servo voltage setting circuit 137 operates to return the high servo output voltage to the inverting input 102 of the differential amplifier 103 and hence to maintain the servo output voltage at or less than the maximum setting.

Were it not for the maximum servo voltage setting circuit 137, the servo output voltage would rise suddenly to cause the magnetic tape 29 to run at excessive speed when the speed sensor 78 failed, for some reason or other, to produce its output signal during tape travel. Also, the servo output voltage would rise inordinately if no tape run stop command was input when the tape was run to its end. These problems can be thoroughly overcome by the maximum servo voltage setting circuit 137.

Although the maximum servo voltage setting circuit 137 also takes the form of a feedback circuit in the illustrated embodiment, the same purpose can be accomplished by other circuit configurations. For instance, the reference voltage delivered from the reference voltage circuit 105 to the non-inverting input 106 of the differential amplifier 103 may be reduced in magnitude when it is desired to limit the maximum magnitude of the servo output voltage. Alternatively, when it is desired to limit the maximum servo output voltage magnitude, a suitably prepared signal indicative of high tape speed may be superposed on the actual tape speed signal, thereby reducing the servo output voltage. As an additional alternative, a limiter circuit may be connected between servo output line 110 and ground, so as to operate upon detection of a trouble by the trouble detector circuit 138.

The trouble detector circuit 138, having its output connected to the maximum servo voltage setting circuit 137 as aforesaid, has two inputs which are connected respectively to the wave shaping circuit 100 and to the OR gate 133. Consequently, the trouble detector circuit 138 is supplied with the forward or reverse tape run command signal through one of its inputs and with the pulse train respresentative of actual tape speed through the other input. The trouble detector circuit 138 produces a "trouble" signal in the case where the output pulses of the shaping circuit 100 represent actual tape speed of less than a prescribed value even though the forward or reverse tape run start command is being input.

A start control circuit 139 has its input connected to the OR gate 133 and its output connected to the inverting input 102 of the differential amplifier 103, in order to prevent any abrupt rise of the servo output voltage at the start of tape travel in either direction. Upon reception of the forward or reverse tape run start command from the OR gate 133, the start control circuit 139 operates to deliver to the differential amplifier input 102 a voltage sufficiently higher than the reference voltage from the reference voltage circuit 105, thereby holding the servo output voltage low. The start control circuit output voltage is then gradually reduced to increase the servo output voltage as required.

The provision of the start control circuit 139 is effective to realize constant tape speed without any appreciable overor undershoot. Although the voltage level of the differential amplifier input 102 is varied by the start control circuit 139 in the illustrated embodiment, the above objective can also be attained by temporarily lowering the reference voltage of the differential amplifier at the start of tape travel in either direction and then by gradually increasing the reference voltage back to the normal level.

Connected to the output of the wave shaping circuit 100, a switching circuit 140 is intended to permit the passage therethrough of the tape speed pulses from the shaping circuit when the forward tape travel is to be terminated. This switching circuit has a control input connected to the forward tape run command terminal 131 via an inverter 141. Thus, in response to the low level forward tape run stop command from the terminal 131, the inverter 141 delivers a high level output to the switching circuit 140 thereby causing same to permit the passage of the tape speed pulses therethrough. The switching circuit 140 performs the logical AND function.

The output of the switching circuit 140 is connected via an amplifier 142 to the base of the first switching transistor 111. Consequently, while the switching circuit 140 is held conductive, the amplified tape speed pulses are applied to the base of the first switching transistor 111 to cause intermittent conduction therethrough.

Let it be assumed that the magnetic tape 29 is now travelling forwardly, with the first hub motor 64 driven as the supply side motor and the second hub motor 65 as the takeup side motor. If then the low level forward tape run stop command is input through the terminal 131, the second switching transistor 112 is rendered nonconductive because its base is connected directly to that terminal 131. Concurrently, the output level of the inverter 141 becomes high to initiate conduction through the switching circuit 140. Amplified by the amplifier 142, the tape speed pulses from the wave shaping circuit 100 are then delivered to the first switching transistor 111 to cause intermittent conduction therethrough.

During each conducting period of the first switching transistor 111, the first diode 115 is nonconductive, so that the first hub motor 64, which is now assumed to be operating as the supply side motor, is grounded not through the tape tension control circuit 113 but directly through the transistor 111. It will thus be seen that the intermittent conduction of the first switching transistor 111 results in the applications of a "braking" voltage of periodically varying magnitude to the supply side hub motor 64, bringing the magnetic tape 29 to a quick stop. The circuit comprising the switching circuit 140, the inverter 141 and the amplifier 142 and labelled 143 may therefore be termed the braking circuit.

It must be mentioned at this juncture that the aforesaid maximum servo voltage setting circuit 137 operates to maximize the servo output voltage when the tape travel in either direction is to be terminated, as will be later described in more detail. By the intermittent conduction of the first switching transistor 111, therefore, the preset maximum servo output voltage is applied to the supply side hub motor 64, so that the braking voltage is higher than the tape tension voltage applied during the tape travel at normal speed.

The braking voltage is applied at progressively increasing time intervals as the tape speed decreases before complete tape stoppage. This is because the time intervals between the successive tape speed pulses from the wave shaping circuit 100 increase in step with the decrease in the tape speed. The quick stops of the magnetic tape 29, thus realized by the braking circuit 143 in association with the first switching transistor 111, are an important feature of the digital tape cassette apparatus 45 which is usually required to make frequent tape stops in use.

Preferably, another similar braking circuit 143' should be provided for braking the second hub motor 65 when reverse tape travel is to be terminated. This second braking circuit likewise comprises a switching circuit 140' connected to the output of the wave shaping circuit 100, an inverter 141' connected between the reverse tape run command terminal 130 and the control input of the switching circuit, and an amplifier 142' connected between the output of the switching circuit and the base of the second switching transistor 112. The operation of the second braking circuit 143' is considered self-evident from the foregoing description of the first named braking circuit 143.

A tape speed reduction sensing circuit 144 is connected to the reset terminal 145 of the wave shaping circuit 100 for resetting same, and hence for terminating the application of the braking voltage to a supply side one of the hub motors 64 and 65 by the first or the second braking circuit 143 or 143', when the tape speed is reduced to a prescribed degree in response to the forward or reverse tape run stop command. To this end the speed reduction sensing circuit 144 has its two inputs connected respectively to the wave shaping circuit 100 and to the OR gate 133. The speed reduction sensing circuit produces an output for resetting the wave shaping circuit 100 at the instant when the recurrence rate of the output pulses therefrom is reduced to the prescribed value while the output from the OR gate 133 is of low level.

With the wave shaping circuit 100 thus cleared before the tape comes to a complete stop, the intermittent conduction of the first or the second switching transistor 111 or 112 by the first or the second braking circuit 143 or 143' is terminated, so that the braking voltage is no longer applied to the first or the second hub motor 64 or 65. For the best results, the wave shaping circuit 100 should be cleared when the tape speed is reduced to about 5 percent of the normal speed. Generally speaking, however, the wave shaping circuit can be cleared when the tape speed becomes less than bout 30 percent of the normal speed.

The servomechanism enters the so-called dead zone when the speed reduction sensing circuit 144 is activated as above, so that there is absolutely no possibility of the braking circuit 143 or 143' overdriving the supply side hub motor 64 or 65. The same objective can be accomplished, however, not by resetting the wave shaping circuit 100 as in the illustrated embodiment but by turning off the light source 82 of the speed sensor 78, the switching circuit 140 or 140' of the braking circuit 143 or 143', or the power supply of the hub motors 64 and 65, when the tape speed is reduced to the prescribed degree.

The first and the second hub motors 64 and 65 are not left completely out of control even after the servomechanism is introduced into the dead zone by the speed reduction sensing circuit 144. This is because of the provision of a diode 146 which is shown to be included in the tape tension control circuit 113 and which is connected between the output of the OR gate 133 and the inverting input 119 of the differential amplifier 120. This diode becomes conductive in response to the low level output from the OR gate 133, that is, to the forward or reverse tape run stop command, with the result that the output voltage of the differential amplifier 120 increases to saturate the first tension control transistor 114. With the consequent decrease in the collector-emitter resistance of this first tension control transistor, the first and the second hub motors 64 and 65 become grounded via the diodes 115 and 116, the transistor 114 and the resistor 117.

Since then the servo output line 110 has the preset maximum servo output voltage under the control of the maximum servo voltage setting circuit 137, as mentioned as will be later described in further detail, this voltage is impressed across the circuit of the first hub motor 64, the first diode 115, the first tension control transistor 114 and the resistor 117, and across the circuit of the second hub motor 65, the second diode 116, the transistor 114 and the resistor 117. It is thus seen that the first and the second hub motors 64 and 65 are energized in the opposite directions under exactly the same conditions, so that the magnetic tape 29 extends tautly between the cassette hubs 27 and 28 as its forward or reverse travel is terminated. The magnetic tape tensed as above at a stop is conducive to immediate or smooth resumption of travel.

Figure 9:
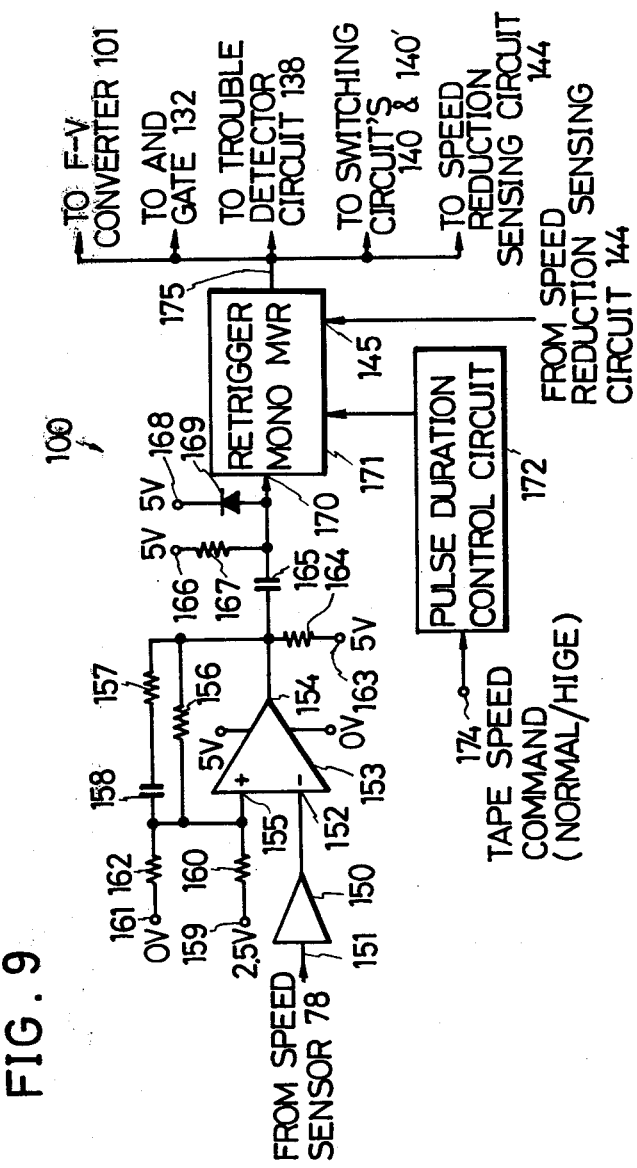
FIG. 9 is a schematic electrical diagram, partly in block, of the wave shaping circuit in the motor control circuitry of FIG. 8.

The various circuits given in the form of blocks in FIG. 8 will hereinafter be described in further detail with reference to the succeeding drawings. In FIG. 9 is shown the detailed configuration of the wave shaping circuit 100, which includes an amplifier 150 connected to the speed sensor 78 via an input line 151. This amplifier 150 has its output connected to the inverting input 152 of an operational amplifier 153 constituting a comparator. Connected between the output 154 and the non-inverting input 155 of the operational amplifier 153 are a feedback resistor 156 and, in parallel therewith, a differentiating feedback circuit comprising a resistor 157 and a capacitor 158. The non-inverting input 155 of the operational amplifier 153 is further connected to a 2.5 volt reference voltage supply terminal 159 via a resistor 160 and also to a 0 volt terminal 161 via a resistor 162.

The output 154 of the operational amplifier 153 is connected to a 5 volt supply terminal 163 via a resistor 164 and also directly to a capacitor 165. This capacitor is connected to a 5 volt supply terminal 166 via a resistor 167. The capacitor 165 and the resistor 167 constitute in combination a differentiating circuit. The capacitor 165 is further connected to another 5 volt supply terminal 168 via a half wave rectifying diode 169 and further directly to the trigger input 170 of a monostable multivibrator 171 of the conventional retriggered type.

Additionally connected to the monostable multivibrator 171 are the outputs of the aforesaid speed reduction sensing circuit 144 and a pulse duration control circuit 172. The sensing circuit 144 is connected to the reset terminal 145 of the multivibrator 171. Supplied with a normal or high speed tape run command signal from an input terminal 174, the pulse duration control circuit 172 correspondingly varies the output pulse durations of the monostable multivibrator 171. In the illustrated embodiment, the inputting of the high speed tape run command from the terminal 174 results in a change in the time constant of the multivibrator, such that the durations of its output pulses are reduced to cause an increase in tape speed.

As previously set forth in connection with FIG. 8, the output line 175 of the monostable multivibrator 171, or of the complete wave shaping circuit 100, is connected to the frequency-to-voltage converter 101, the AND gate 132, the trouble detector circuit 138, the switching circuits 140 and 140', and the speed reduction sensing circuit 144.

In the wave shaping circuit 100 of the foregoing configuration, the comparator comprising the operational amplifier 153 is intended to compare the tape speed signal from the speed sensor 78 with the reference voltage. The differentiating circuit comprising the capacitor 165 and the resistor 167 is intended to detect the trailing edges of the comparator output pulses.

Figure 10:
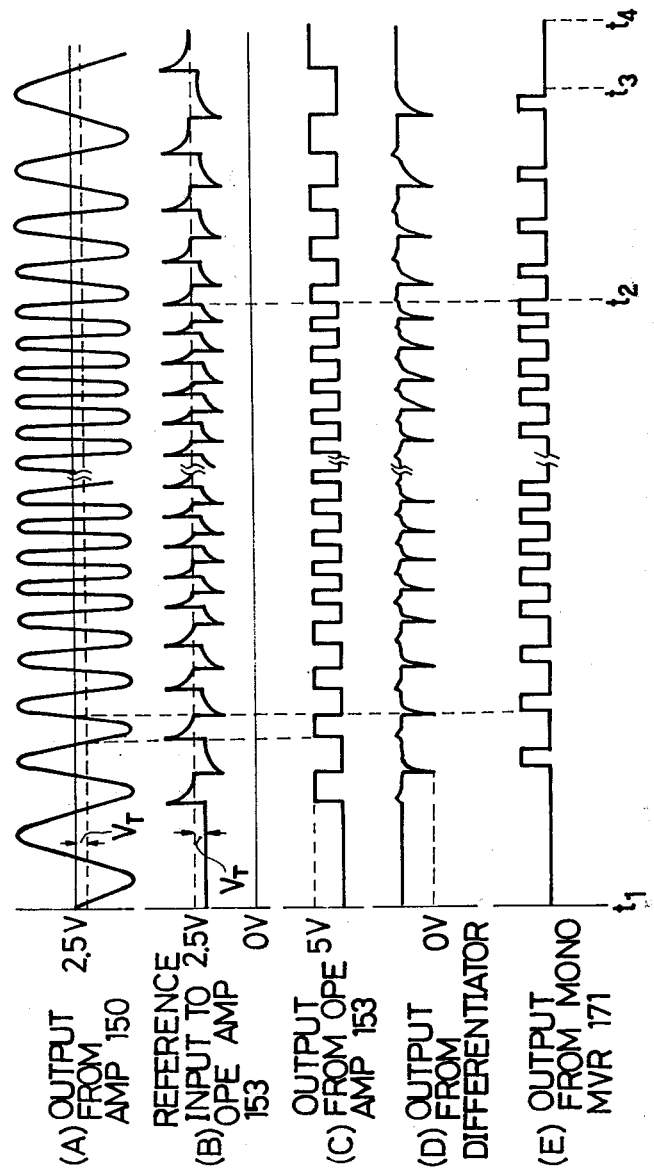
FIG. 10 is a graphical diagram of various idealized waveforms useful in explaining the operation of the wave shaping circuit of FIG. 9.

FIG. 10A diagrammatically represents the tape speed signal generated by the speed 78 and subsequently amplified by the amplifier 150. Delivered to the inverting input 152 of the operational amplifier 153, the pulsating tape speed signal is thereby compared with the 2.5-volt reference voltage having a hysteresis voltage $V_T$, given in FIG. 10B, that is being delivered to its non-inverting input 155. The operational amplifier 153 produces a 5-volt output when the tape speed signal on its decay crosses the voltage level of $2.5-V_T$, and the amplifier output returns to zero when the tape speed signal on its subsequent rise crosses the 2.5-volt level. The output from the operational amplifier 153 is therefore in the form of a rectangular pulse train as represented in FIG. 10C.

The comparator output pulses of FIG. 10C are then delivered to the differentiating circuit comprising the capacitor 165 and the resistor 167. The differentiating circuit produces output pulses, given in FIG. 10D, that are indicative of the trailing edges of the comparator output pulses. The recurrence rate of these differentiator output pulses is equal to that of the tape speed signal given in FIG. 10A.

The differentiator output pulses of FIG. 10D are delivered to the trigger input 170 of the monostable multivibrator 171, which operates in the known fashion to produce corresponding output pulses given in FIG. 10E. The recurrence rate of the multivibrator output pulses represents the actual tape speed.

In the illustrated embodiment, the duty factor of the output from the monostable multivibrator 171 is set at about 50 percent at normal tape speed. This duty factor, of course, becomes less than 50 percent immediately after the start, and immediately before the stop, of tape travel. If the tape run stop command is input at a moment t2 in time, for example, the time intervals between the multivibrator output pulses of FIG. 10E become progressively longer thereafter, in step with the decrease in tape speed, until at last no pulse becomes produced.

As mentioned, the speed reduction sensing circuit 144 is connected to the reset terminal 145 of the monostable multivibrator 171 for resetting same when the actual tape speed is reduced to less than about 30 percent, preferably about 5 percent, of the normal speed. It will be seen from FIG. 10E that the multivibrator 171 is reset at a moment t3 which preceds a moment t4 when the tape comes to a complete stop.

Figure 11:
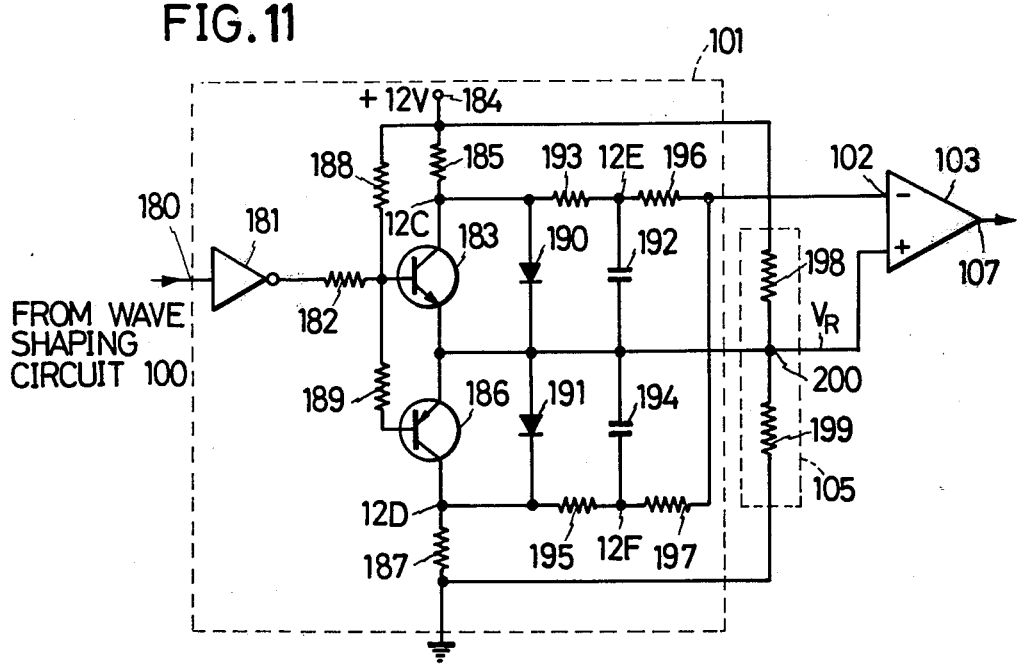
FIG. 11 is a schematic electrical diagram of the frequency-to-voltage converter in the motor control circuitry of FIG. 8, the converter being shown together with the differential amplifier and the reference voltage circuit which are both included in the servo amplifier circuit in the circuitry of FIG. 8.

With reference to FIG. 11, the frequency-to-voltage converter 101 illustrated in detail therein has an input line 180 connected directly to the output line 175, FIG. 9, of the wave shaping circuit 100. The converter input line 180 is connected to an inverting amplifier 181, the output of which is connected via a resistor 182 to the base of a transistor 183 of the NPN type. The collector of this transistor is connected to a +12 volt supply terminal 184 via a resistor 185, and its emitter is connected to the emitter of another transistor 186, which is of the PNP type. The collector of this PNP transistor 186 is grounded via a resistor 187. A resistor 188 is connected between the 12 volt supply terminal 184 and the base of the NPN transistor 183, and a further resistor 189 is connected between this NPN transistor base and the base of the PNP transistor 186. Consequently, during each conducting period of the NPN transistor 183, the PNP transistor 186 is held nonconductive, and vice versa.

The NPN and the PNP transistors 183 and 186 are further connected in parallel with diodes 190 and 191 respectively. The diode 190 is connected in parallel with a capacitor 192 via a resistor 193, and the other diode 191 is likewise connected in parallel with a capacitor 194 via a resistor 195. A circuit point 12E, at which the capacitor 192 and the resistor 193 are interconnected, is connected via a resistor 196 to the inverting input 102 of the differential amplifier 103 included in the servo amplifier circuit 104. Another circuit point 12F, at which the capacitor 194 and the resistor 195 are interconnected, is also connected via a resistor 197 to the inverting input 102 of the differential amplifier 103. Consequently, the outputs from the capacitors 192 and 194 are delivered combinedly to the differential amplifier input 102.

Resistors 198 and 199 connected serially between the 12 volt supply terminal 184 and the ground constitute in combination the reference voltage circuit 105 included in the servo amplifier circuit 104. A point 200 of connection between the resistors 198 and 199 is connected to the non-inverting input 106 of the differential amplifier 103 to supply the reference voltage $V_R$ thereto. This circuit point 200 is further connected to the emitters of the NPN and the PNP transistors 183 and 186.

Figure 12:
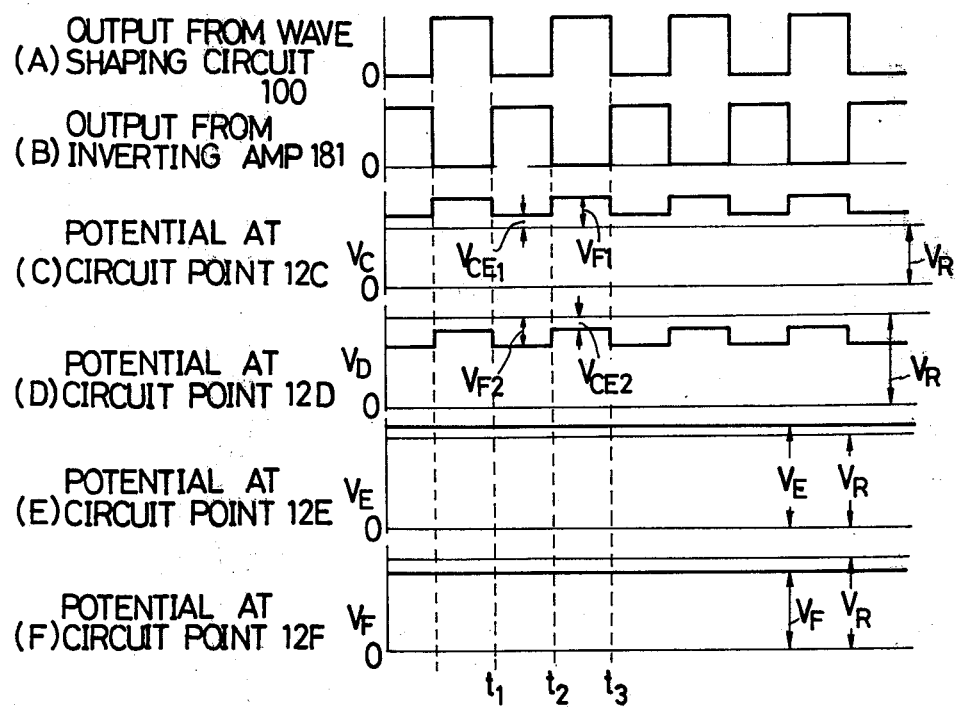
FIG. 12 is a graphical diagram of various idealized waveforms useful in explaining the operation of the frequency-to-voltage converter of FIG. 11.

In the circuit configuration of FIG. 11, the output waveform of FIG. 12A from the wave shaping circuit 100 is converted into the waveform of FIG. 12B by the inverting amplifier 181. Supplied with this output pulse train from the inverting amplifier 181, the NPN transistor 183 is held conductive, and the PNP transistor 186 nonconductive, during the time interval of, for example, moments t1 to t2 in FIG. 12. During this conducting period of the NPN transistor 183, a current flows through a path comprising the supply terminal 184, the resistor 185, the transistor 183, the diode 191, the resistor 187, and the ground.

It will therefore be seen that the potential $V_C$ at a point 12C in the collector circuit of the NPN transistor 183 becomes higher than the reference voltage $V_R$ at the circuit point 200 by the collector-emitter voltage $V_{CE1}$ of the transistor 183, as represented in FIG. 12C. It will also be noted from FIG. 12D that the potential $V_D$ at a point 12D in the collector circuit of the PNP transistor 186 becomes lower than the reference voltage $V_R$ by the forward voltage $V_{F2}$ of the diode 191.

During the subsequent period of moments t2 to t3, when the output from the amplifier 181 is of low level, the NPN transistor 183 is held nonconductive, and the PNP transistor 186 conductive. A current flows, therefore, through a path comprising the supply terminal 184, the resistor 185, the diode 190, the transistor 186, the resistor 187, and the ground. The potential $V_C$ at the circuit point 12C becomes then higher than the reference voltage $V_R$ by the forward voltage $V_{F1}$ of the diode 190, whereas the potential $V_D$ at the circuit point 12D becomes lower than the reference voltage $V_R$ by the collector-emitter voltage $V_{CE2}$ of the PNP transistor 186, as will be noted from FIGS. 12C and 12D.

If it is assumed that $V_{CE1}=V_{CE2}=V_{CE}$, that $V_{F1}=V_{F2}=V_F$, and that $V_F>V_{CE}$, then there is produced at the circuit point 12C the rectangular wave which is of low level ($V_R+V_{CE}$) when the output from the inverting amplifier 181 is of high level and which is of high level ($V_R+V_F$) when the inverting amplifier output is of low level. Also, at the circuit point 12D, there is produced the rectangular wave which is of low level ($V_R-V_F$) when the inverting amplifier output is of high level and which is of high level ($V_R-V_{CE}$) when the inverting amplifier output is of low level.

The rectangular wave thus generated at the circuit point 12C is charged on the capacitor 192 via the resistor 193 and is discharged to the inverting input 102 of the differential amplifier 103 via the resistor 196. Therefore, by suitably selecting the magnitudes of the capacitor 192 and the resistors 193 and 196, there can be obtained at the circuit point 12E a smoothed voltage $V_E$, FIG. 12E, that is higher than the reference voltage $V_R$ and which is to vary with the relative durations of the low level ($V_R+V_{CE}$) portions and high level ($V_R+V_F$) portions of the rectangular wave given in FIG. 12C.

The rectangular wave generated at the circuit point 12D, on the other hand, is charged on the capacitor 194 via the resistor 195 and is discharged to the inverting input 102 of the differential amplifier 103 via the resistor 197. By suitably selecting the magnitudes of the capacitor 194 and the resistors 195 and 197, there can be obtained at the circuit point 12F a smoothed voltage $V_F$, FIG. 12F, that is lower than the reference voltage $V_R$ and which is to vary with the relative durations of the low level ($V_R-V_F$) portions and high level ($V_R-V_{CE}$) portions of the rectangular wave given in FIG. 12D.

Although the smoothed voltages $V_E$ and $V_F$ are plotted by the straight lines in FIGS. 12E and 12F, these voltages will have some ripple in practice. The voltages $V_E$ and $V_F$ are delivered combinedly to the inverting input 102 of the differential amplifier 103, as mentioned, so that this differential amplifier produces an output voltage equal to $(V_E+V_F)-V_R$.

If the tape speed becomes less than the normal, for example, the time intervals between the input pulses to the frequency-to-voltage converter 101 increase, because the durations of these input pulses are held constant by the monostable multivibrator 171 of the wave shaping circuit 100. The result is a decrease in the input voltage to the inverting input 102 of the differential amplifier 103, so that the output voltage of this amplifier increases to cause a corresponding increase in the tape speed.

The symmetrical configuration of the frequency-to-voltage converter 101 as illustrated in FIG. 11 is intended to enhance its immunity to possible fluctuations in supply voltage or in ambient temperature. If desired, therefore, the converter configuration may be simplified by omitting, for example, the lower half of the circuit of FIG. 11.

Figure 13:
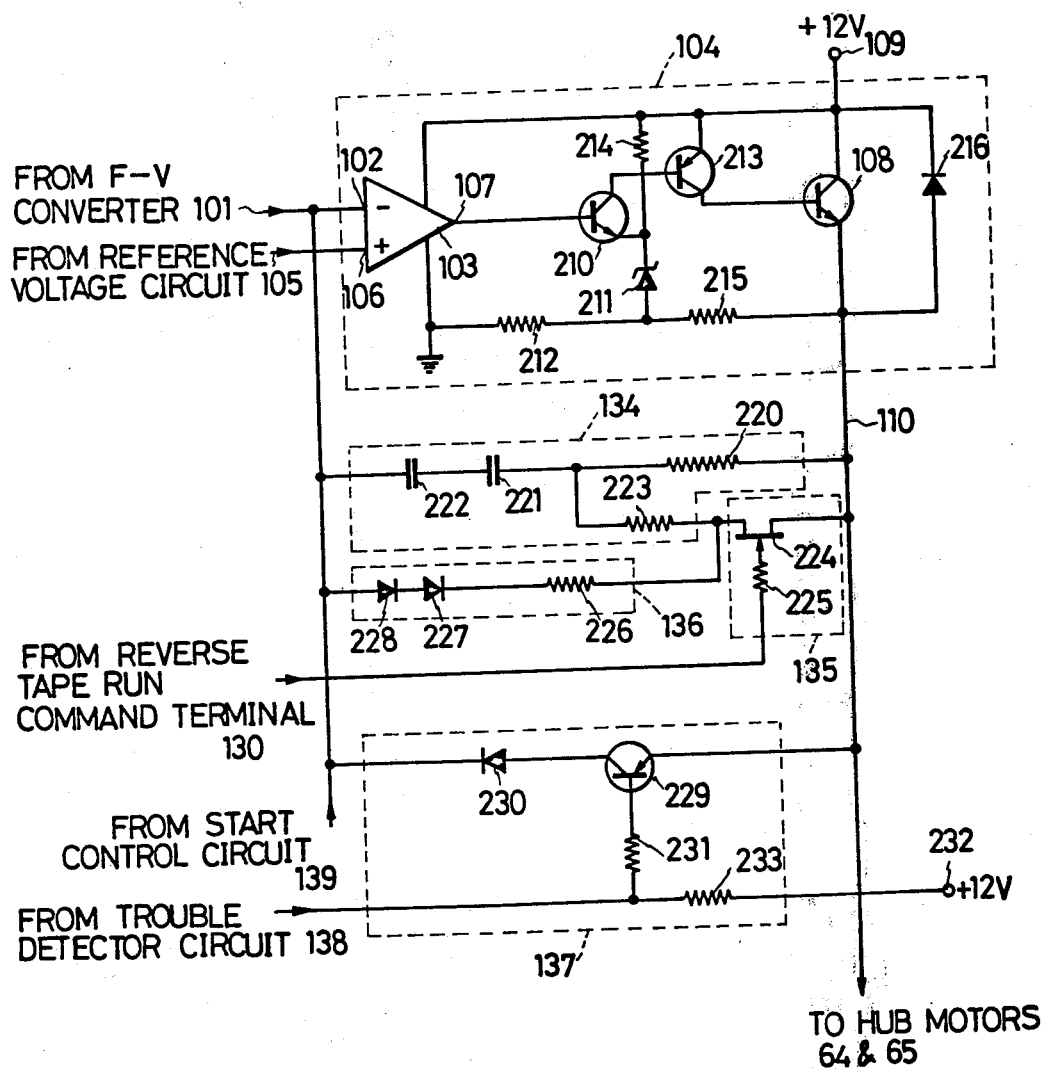
FIG. 13 is a schematic electrical diagram of the servo amplifier circuit, the feedback circuit, the feedback control circuit, the minimum servo voltage setting circuit, and the maximum servo voltage setting circuit in the motor control circuitry of FIG. 8.

FIG. 13 is the detailed representations of the servo amplifier circuit 104, the feedback circuit 134, the feedback control circuit 135, the minimum servo voltage setting circuit 136, and the maximum servo voltage setting circuit 137. The servo amplifier circuit 104 includes the differential amplifier 103 having its inputs 102 and 106 connected respectively to the frequency-to-voltage converter 101 and to the reference voltage circuit 105, both shown in detail in FIG. 11, in order to effect analog comparison of the input voltages therefrom. The differential amplifier 103 has its supply terminals connected respectively to the 12 volt supply terminal 109 and to ground, and its output 107 connected to the base of an NPN transistor 210.

The transistor 210 has its emitter grounded via a serial connection of zener diode 211 and resistor 212 and its collector connected to the base of another transistor 213, which is of the PNP type. The zener diode 211 has its cathode further connected to the 12 volt supply terminal 109 via a resistor 214. The PNP transistor 213 has its emitter connected to the supply terminal 109 and its collector to the base of the NPN transistor 108, which is shown also in FIG. 8. Besides being connected to the servo output line 110, the emitter of the NPN transistor 108 is connected to the anode of the zener diode 211 via a resistor 215. A diode 216 is connected in parallel with, and in inverse relationship to, the NPN transistor 108 for protecting same.

With the servo amplifier circuit 104 being configured as in the foregoing, the three transistors 210, 213 and 108 included therein are to be selectively rendered conductive in accordance with the magnitude of the output from the differential amplifier 103. For example, upon decrease in the input voltage to the inverting input 102 of the differential amplifier 103, its output voltage increases thereby causing a corresponding increase in the base current of the final stage transistor 108. Since then the collector-emitter resistance of the transistor 108 decreases, the servo output voltages from its emitter increases correspondingly to cause an increase in the tape speed to the required degree.

Connected between the servo output line 110 and the inverting input 102 of the differential amplifier 103 is the integrator type feedback circuit 134 which comprises a serial connection of resistor 220 and two capacitors 221 and 222. The resistor 220 is further connected in parallel with a serial connection of another resistor 223 and a field effect transistor 224. Included in the feedback control circuit 135, the field effect transistor 224 has its source connected to the servo output line 110, its drain to the resistor 223, and its gate to the reverse tape run command terminal 130 via a resistor 225.

Upon inputting of the reverse tape run start command from the terminal 130, therefore, the field effect transistor 224 is rendered conductive to establish the parallel connection of the resistors 220 and 223 of the feedback circuit 134 and hence to reduce the feedback resistance. It is thus seen that the loop gain of the servomechanism is made less during reverse tape travel than during forward tape travel.

It will be recalled by referring back to FIG. 7, for example, that the speed sensing roller 77 is maintained in more proper frictional contact with the magnetic tape 29 of the cassette 25 during forward tape travel than during reverse tape travel. Thus, if the servo loop gain were not made less during reverse tape travel, the servomechanism would not operate in the intended manner, making impossible the accurate backspacing of the tape. This problem is overcome by the feedback control circuit 135.

FIG. 13 further illustrates the minimum servo voltage setting circuit 136, which is connected between the drain of the field effect transistor 224 and the inverting input 102 of the differential amplifier 103. The minimum servo voltage setting circuit 136 comprises a serial connection of resistor 226 and two diodes 227 and 228. Since the diodes 227 and 228 have their anodes connected to the inverting input 102 of the differential amplifier 103, these diodes are rendered conductive only when the servo output voltage becomes lower than the voltage applied to the amplifier input 102.

During forward tape travel, the field effect transistor 224 is held nonconductive, so that the minimum servo voltage setting circuit 136 is connected to the servo output line 110 via the resistors 220 and 223 of the feedback circuit 132. Consequently, the minimum servo voltage setting circuit 136 remains substantially inoperative during forward tape travel. This is because the speed sensing roller 77 makes far more proper frictional contact with the tape during forward tape travel than during reverse tape travel, as mentioned, so that the minimum servo voltage can be set extremely low during forward tape travel.

While the field effect transistor 224 is conducting during reverse tape travel, the minimum servo voltage setting circuit 136 is connected to the servo output line 110 therethrough. The minimum servo voltage can therefore be set higher during reverse tape travel than during forward tape travel. As the servo output voltage tends to drop below the minimum setting, the diodes 227 and 228 become conductive to feed the low voltage back to the inverting input 102 of the differential amplifier 103 and hence to maintain the servo output voltage above the minimum setting. The hunting of the servomechanism can thus be prevented by the minimum servo voltage setting circuit 136.

The minimum servo voltage setting may be varied as required or desired by, for example, suitably selecting the number of diodes used in the minimum servo voltage setting circuit 136. Thus, in accordance with this invention, the servo loop gain is made less during reverse tape travel by the field effect transistor 224, and the minimum servo voltage setting is made higher during reverse tape travel by the circuit 134. These features of the invention combine to enhance the accuracy of the servo control of tape speed during reverse tape travel.

Also illustrated in FIG. 13 is the maximum servo voltage setting circuit 137, which comprises a PNP transistor 229 and a diode 230 connected in series between the servo output line 110 and the inverting input 102 of the differential amplifier 103. The base of the transistor 229 is connected to a resistor 231 which in turn is connected directly to the output of the trouble detector circuit 138 on the one hand and, on the other hand, to a +12 volt supply terminal 232 via a resistor 233.

Upon delivery of a low level output from the trouble detector circuit 138, the transistor 229 of the maximum servo voltage setting circuit 137 is rendered conductive thereby feeding the servo output voltage back to the differential amplifier 103 through the transistor 229 and the diode 230. The servo output voltage is thus maintained at or less than the maximum setting.

Figure 14:
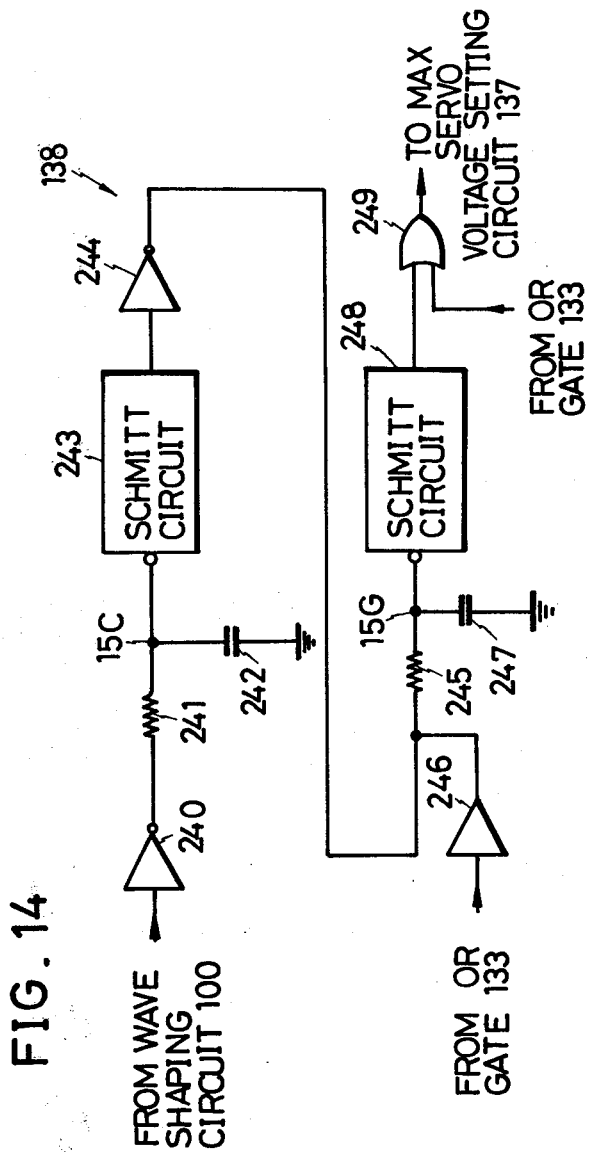
FIG. 14 is a schematic electrical diagram, partly in block, of the trouble detector circuit in the motor control circuitry of FIG. 8.

FIG. 14 illustrates in detail the trouble detector circuit 138, which includes an inverter 240 of the open-collector transistor-transistor logic (TTL) configuration. This inverter has its input connected to the monostable multivibrator 171, FIG. 9, of the wave shaping circuit 100 and its output connected to one of the extremities of a resistor 241. The other extremity of the resistor 241 is grounded via an integrating capacitor 242 on the one hand and, on the other hand, connected to the input of an inverting Schmitt circuit 243 of the conventional Schmitt TTL configuration. The output of the Schmitt circuit 243 is connected to an inverter 244 of the open-collector transistor configuration and thence to one of the extremities of another resistor 245.

Also connected to said one extremity of the resistor 245 is an amplifier 246 which in turn is connected to the output of the OR gate 133 shown in FIG. 8. The other extremity of the resistor 245 is grounded via another capacitor 247 on the one hand and, on the other hand, connected to the input of another inverting Schmitt circuit 248 of the Schmitt TTL configuration. This second Schmitt circuit 248 is connected to one of the two inputs of an OR gate 249, to the other input of which is connected the OR gate 133 of FIG. 8.

FIG. 15A represents the pulse train delivered from the wave shaping circuit 100 to the trouble detector circuit 138, which pulse train is inverted by the inverter 240 into the form represented in FIG. 15B. The capacitor 242 is charged and discharged as dictated by the inverted pulses of FIG. 15B, being charged during the high level periods of the pulse train and discharged during its low level periods. FIG. 15C represents the consequent potential variations at the circuit point 15C where the resistor 241 and the capacitor 242 are interconnected.

Having its input connected directly to the circuit point 15C, the inverting Schmitt circuit 243 produced an output whose level becomes high when the potential at the circuit point 15C becomes less than its first trigger level 250 indicated in FIG. 15C. If the forward or reverse tape run start command is input at a moment t1 in time, as indicated in FIG. 15F, the wave shaped circuit 100 will start producing the tape speed pulses simultaneously with the start of tape travel as in FIG. 15A. As the potential at the circuit point 15C drops past the first trigger level 250 at a subsequent moment t2 because of the discharge of the capacitor 242, the output level of the Schmitt circuit 243 becomes high as in FIG. 15D.

The tape speed immdiately after starting is so low, however, that the potential at the circuit point 15C may rise back to the second trigger level 250' of the Schmitt circuit 243 which is determined by its hysteresis, as at a moment t3 which precedes the moment when the second pulse is produced by the wave shaping circuit 100. Consequently, the output level of the Schmitt circuit 243 temporarily becomes low as in FIG. 15D. After the potential at the circuit point 15C again drops past the first trigger level 250 at a subsequent moment t4, the recurrence rate of the output pulses of the wave shaping circuit 100 becomes so high, with the increase in the tape speed, that the potential no longer rises to the second trigger level 250'. The output from the Schmitt circuit 243 is therefore maintained in its high level.

Figure 15:
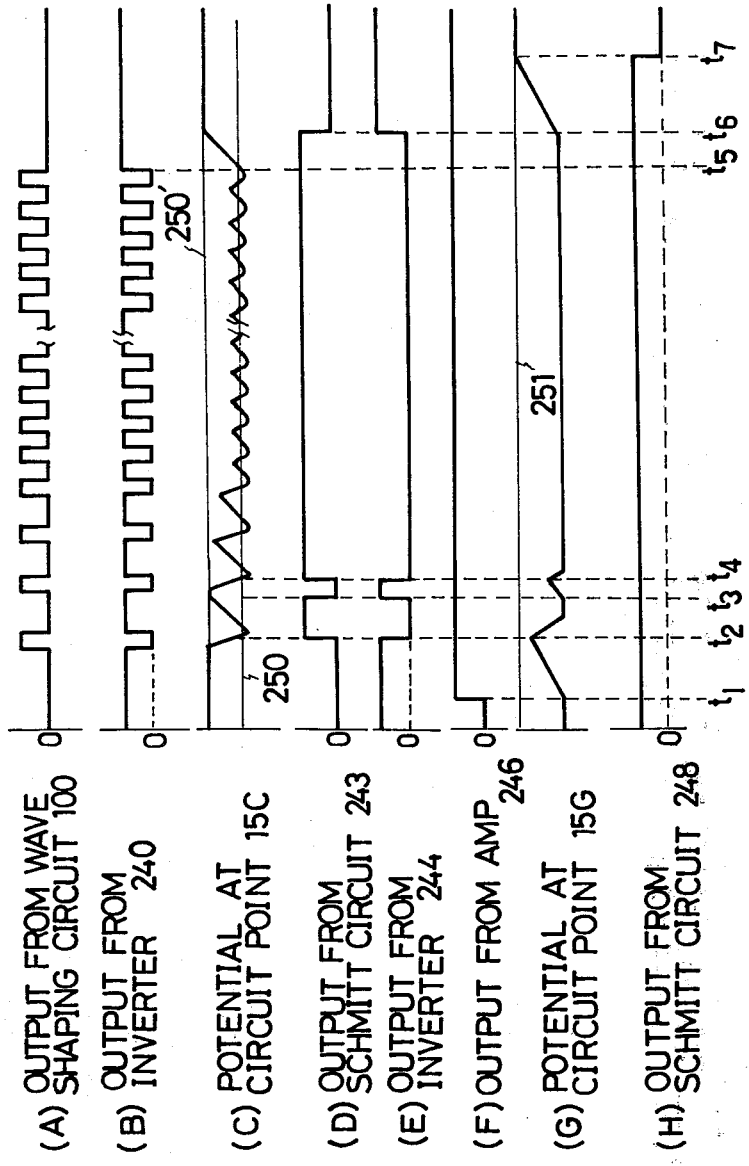
FIG. 15 is a graphical diagram of various idealized waveforms useful in explaining the operation of the trouble detector circuit of FIG. 14.

In FIG. 15 the delivery of the output pulses from the wave shaping circuit 100 is discontinued at a moment t5, because of some trouble of the speed sensing roller 77 or of the speed sensor 78. In this case, or in event the tape run start command continues to be input after the tape has been completely wound up on either of the cassette hubs 27 and 28 at the moment t5, the capacitor 242 continues to be charged after the moment t5 until at last the potential at the circuit point 15C rises to the second trigger level 250' of the Schmitt circuit 243 at a moment t6. Thereupon the output level of this Schmitt circuit becomes low as in FIG. 15D. This does not immediately results in the generation of the "trouble" signal, however, because the illustrated trouble detector circuit 138 has two integrator stages.

The output waveform of the Schmitt circuit 243 is inverted by the inverter 244 into the waveform represented in FIG. 15E. As will be apparent from FIG. 15G, the second capacitor 247 of the trouble detector circuit 138 is charged only when the output level of the inverter 244 is high and, at the same time, when the tape run start command is being input through the amplifier 246. When the charge on this second capacitor 247 reaches the trigger level 251 of the second Schmitt circuit 248, the output level of this circuit becomes low as in FIG. 15H.

It will be observed from FIG. 15G that the charging of the second capacitor 247 is initiated also at the moments t1 and t3. The second capacitor is then charged for such short periods, however, that the trigger level 251 of the second Schmitt circuit 248 is not reached. Since no pulses are supplied from the wave shaping circuit 100 after the moment t5, the second capacitor 247 is then charged to the trigger level of the second Schmitt circuit 248, so that its output level becomes low at a moment t7. This output level drop of the second Schmitt circuit 248 is utilized as the "trouble" signal, which is delivered to the maximum servo voltage setting circuit 137 via the OR gate 249.

Since the other input of the OR gate 249 is connected to the OR gate 133 of FIG. 8, the OR gate 249 produces a low level output also upon inputting of the forward or reverse tape run stop command. It is thus seen that the transistor 229, FIG. 13, of the maximum servo voltage setting circuit 137 is rendered conductive by the output signal of the trouble detector circuit 138 either when a trouble is detected by the latter or when the tape run stop command is input. In the trouble detector circuit 138 shown in FIG. 14, the capacitor 242 and 247 are charged from the power supplies of the Schmitt circuits 243 and 248, so that the capacitors are charged only to the respective trigger levels 250' and 251.

Figures 16, 17:
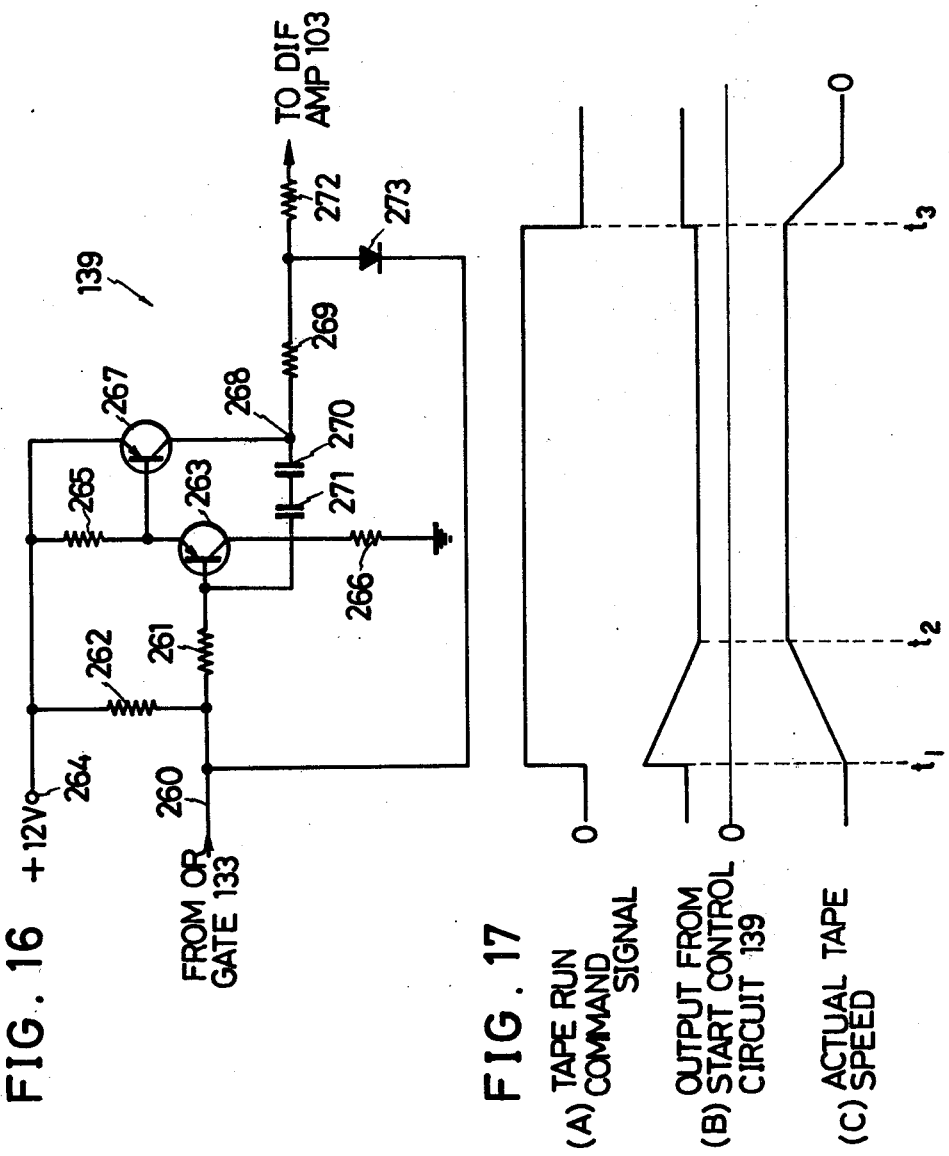
FIG. 16 is a schematic electrical diagram of the start control circuit in the motor control circuitry of FIG. 8.
FIG. 17 is a graphical diagram of various idealized waveforms useful in explaining the operation of the start control circuit of FIG. 16.

FIG. 16 illustrates in detail the start control circuit 139, which has its input line 260 connected to the OR gate 133 of FIG. 8. This input line is connected to one of the extremities of each of resistors 261 and 262. The other extremity of the resistor 261 is connected to the base of a PNP transistor 263, so that this transistor is rendered conductive in response to the forward or reverse tape run start command. The other extremity of the resistor 262 is connected to a +12 volt supply terminal 264. The transistor 263 has its emitter connected to the supply terminal 264 via a resistor 265 and its collector grounded via a resistor 266.

The emitter of the transistor 263 is further connected to the base of another PNP transistor 267. The emitter of this second transistor 267 is connected to the supply terminal 264, and its collector to a point 268 of connection between resistor 269 and capacitor 270. The second transistor 267 is therefore held nonconductive when the first transistor 263 is nonconductive. Another capacitor 271 is connected between the base of the first transistor 263 and the capacitor 270. The resistor 269 has its output extremity connected to a resistor 272 and thence to the inverting input 102 of the differential amplifier 103 shown in FIGS. 8 and 13. A diode 273 is connected between the input line 260 and the resistor 272.

In the start control circuit 139 of the foregoing configuration, the first and the second transistors 263 and 267 are both held conductive when no tape run start command is being input. The capacitors 270 and 271 in serial connection are then charged through the circuit comprising the 12 volt supply terminal 264, the second transistor 267, the capacitors 270 and 271, the resistor 261, and the low level input line 260. The potential at the circuit point 268 thus builds up to about 12 volts.

Since the reference voltage delivered to the noninverting input 106 of the differential amplifier 103 has a magnitude of about 3 volts, and since the magnitude of the voltage normally delivered to its inverting input 102 is more or less close to that reference voltage magnitude, the potential of about 12 volts at the circuit point 268 is extremely high in comparison with such usual input voltages of the differential amplifier 103. The diode 273 is conductive when no tape run start command is being received through the input line 260, so that the high potential at the circuit point 268 is not impressed to the inverting input 102 of the differential amplifier 103. Instead, the voltage determined by the maximum servo voltage setting circuit 137 is now being impressed to the differential amplifier input 102.

Upon delivery of the forward or reverse tape run start command through the input line 260, as represented in FIG. 17A, the first and the second transistors 263 and 267 and the diode 273 are all rendered nonconductive. The capacitors 270 and 272 are therefore discharged through the resistors 269 and 272, while being charged in the opposite direction. Then the potential at the circuit point 268 gradually decreases, and the output voltage delivered from this start control circuit 139 to the inverting input 102 of the differential amplifier 103 also gradually decreases.

If the tape run start command is input at a moment t1, as in FIG. 17A, the high input voltage corresponding to the high potential at the circuit point 268 is then impressed to the inverting input 102 of the differential amplifier 103, as represented in FIG. 17B, in order to prevent an abrupt rise in the voltage on the servo output line 110 shown in FIGS. 8 and 13. The takeup side hub motor 64 or 65 is therefore energized with a relatively low servo output voltage at the start, and the servo output voltage gradually increases with the gradual decrease in the start control circuit output voltage delivered to the differential amplifier input 102. In this manner the tape speed gradually increases, as represented in FIG. 17C, until it reaches the normal level at a moment t2.

The level of the tape run command signal of FIG. 17A is turned low to input the stop command at a moment t3, whereupon the capacitors 270 and 271 start to be charged through the second transistor 267 as above stated. Although the voltage delivered to the inverting input 102 of the differential amplifier 103 is controlled in the illustrated embodiment in order to effect smooth start-up of the tape, the same objective can also be accomplished by controlling the reference voltage delivered to the non-inverting input 106 of the differential amplifier.

Figure 18:
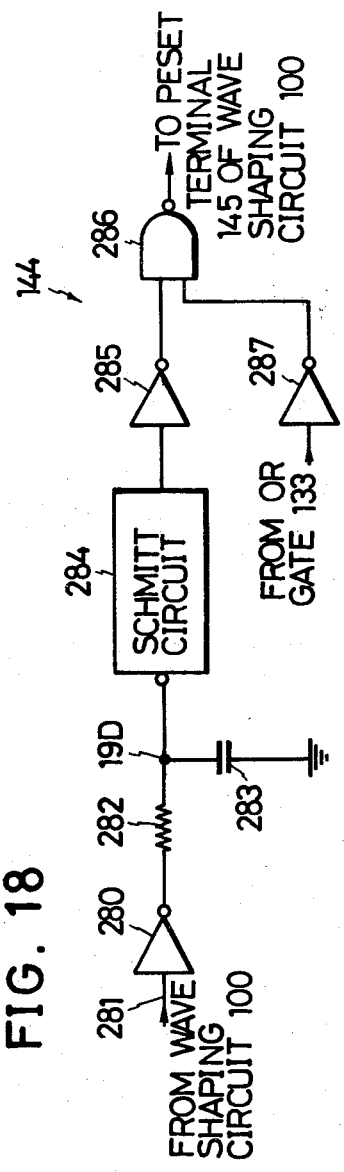
FIG. 18 is a schematic electrical diagram of the tape speed reduction sensing circuit in the motor control circuitry of FIG. 8.

FIG. 18 is a detailed representation of the speed reduction sensing circuit 144, which includes an inverter 280 of the open-collector transistor configuration having its input connected via a line 281 to the monostable multivibrator 171, FIG. 9, of the wave shaping circuit 100 and its output connected to one of the extremities of a resistor 282. The other extremity of this resistor 282 is grounded via an integrating capacitor 283. An inverting Schmitt circuit 284 of the Schmitt TTL configuration, having its input connected to a point 19D of connection between resistor 282 and capacitor 283, is adapted to produce a low level output when the capacitor is charged to a predetermined degree.

The output of the Schmitt circuit 284 is connected via an inverter 285 to one of the two inputs of a NAND circuit 286, to the other input of which is connected the OR gate 133, FIG. 8, via an inverter 287. The NAND circuit 286, therefore, produces a low level output only when simultaneously supplied with high level inputs from the Schmitt circuit 284 and the OR gate 133 via the inverters 285 and 287. The output of the NAND circuit 286 is connected to the reset terminal of the monostable multivibrator 171 included in the wave shaping circuit 100.

FIG. 19C represents the forward or reverse tape run command signal, from which it is seen that the stop command is input at a moment t1. Before this moment t1, therefore, the tape speed is constant as in FIG. 19B, and a train of constantly spaced pulses is being supplied from the wave shaping circuit 100 to this speed reduction sensing circuit 144 as in FIG. 19C. During such tape travel at constant speed, the capacitor 283 is repeatedly charged and discharged, in such a way that the potential at the circuit point 19D does not built up to the trigger level 288 of the Schmitt circuit 284, as will be apparent from FIG. 19D.

Upon inputting of the forward or reverse tape run stop command at the moment t1 as in FIG. 19, the tape is brought to a rapid stop by the first or the second braking circuit 143 or 143', FIG. 8, depending upon whether the tape has been travelling forwardly or reversely. As the tape speed rapidly decreases after the moment t1 as in FIG. 19B, the time intervals between the successive output pulses of the wave shaping circuit 100 correspondingly increase as in FIG. 19C. Although FIG. 19C shows only a few such pulses after the moment t1 in order to facilitate illustration, a far greater number of pulses will be supplied from the wave shaping circuit in practice.

With the gradual increase in the time intervals between the output pulses of the wave shaping circuit 100, the potential at the circuit point 19D rises correspondingly until, at a moment t2 in FIG. 19D, the potential reaches the trigger level 288 of the Schmitt circuit 284. The output level of the Schmitt circuit thus becomes low at the moment t2 as in FIG. 19E. At this moment t2, as above stated, the tape speed is at about 5 percent of the normal speed.

The output levels of both inverters 285 and 287 are therefore high after the moment t2, so that the output level of the NAND circuit 286 is low as in FIG. 19F. This low level output from the NAND circuit 286, or from the speed reduction sensing circuit 144, is delivered to the monostable multivibrator 171 of the wave shaping circuit 100 for resetting same, so that no pulses are generated after the moment t2. If the monostable multivibrator 171 were not reset at the moment t2, the phantom pulse or pulses seen in FIG. 19C would be generated thereafter.

With the monostable multivibrator 171 thus reset at the moment t2, the servomechanism enters the dead zone. In the illustrated embodiment, however, the first and the second hub motors 64 and 65 are further energized in the opposite directions under the same conditions by the conduction of the first tension control transistor 114, in order that the tape may extend tautly between the cassette hubs 27 and 28 when brought to a complete stop, as set forth above in connection with FIG. 8. If such taut extension of the tape at a stop is not desired, both hub motors 64 and 65 may be cut off from their power supply upon production of the low level output from the speed reduction sensing circuit 144. As the hub motors 64 and 65 substantially cease to be energized, the tape travel and the motor rotation come to a complete stop, after continued slight tape travel by inertia, at a moment t3 in FIG. 19. It is understood that the capacitor 283 in the speed reduction sensing circuit 144 of FIG. 18 is charged only to the trigger level 288 of the Schmitt circuit 284, being charged from the power supply of this Schmitt circuit.

Figure 21:
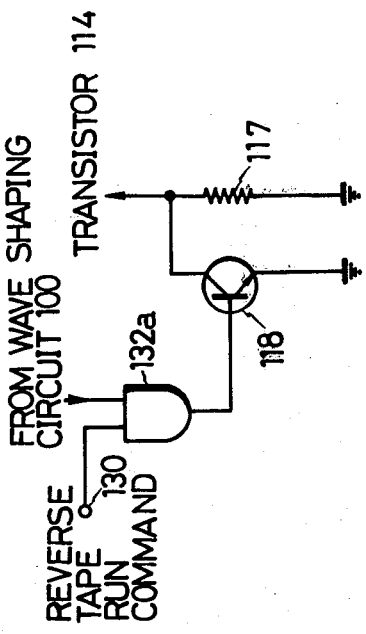
FIG. 21 is a partial, schematic electrical diagram of a modification of the tape tension control circuit of FIG. 8.

FIG. 21 illustrates a modification of the tape tension control circuit 113 of FIG. 8, which modification includes an AND gate 132a having its output connected to the base of the second tension control transistor 118 which in turn is connected in parallel with the resistor 117. Unlike the AND gate 132 of FIG. 8, this AND gate 132a has one of its two inputs connected directly to the reverse tape run command terminal 130, instead of to the OR gate 133. The other input of the AND gate 132a is connected to the wave shaping circuit 100, just like the AND gate 132. The other details of circuit configuration can be exactly as illustrated in FIG. 8.

According to the modified tape tension control circuit of FIG. 21, therefore, the output pulses of the wave shaping circuit 100 are delivered through the AND gate 132a to the base of the second tension control transistor 117 to cause intermittent conduction therethrough only when the tape is travelling in the reverse direction. The second tension control transistor 117 is of course held nonconductive during forward tape travel. It is therefore clear that the tape tension voltage applied to the supply side hub motor 64 or 65 is higher during reverse tape travel than during forward tape travel.

As will be seen by referring back to FIG. 7, the speed sensing roller 77 is, during reverse tape travel, in contact with the magnetic tape 29 travelling from the supply side cassette hub 28 toward the magnetic head 66. Thus, if the tape were subjected to the same degree of tension during its forward and reverse travels, the speed sensing roller 77 would make poorer frictional contact therewith during reverse than during forward tape travel.

This problem can be overcome by the modified tape tension control circuit of FIG. 21. If desired, the tape may be subjected to an equally high degree of tension during its forward and reverse travels, but this is not desirable in view of the increased power consumption, reduced service life, and greater heating of the hub motors.

While the present invention has been shown and described in connection with an exemplary embodiment and a slight modification thereof, it is understood that the invention is not to be restricted by the exact details of the disclosure herein, since numerous changes will readily occur to those skilled in the art. For example, instead of comparing the analog output voltages of the frequency-to-voltage converter 101 and the reference voltage circuit 105 by the differential amplifier 103, as in the motor control circuitry of FIG. 8, the phase lock loop (PLL) control technique may be adopted, by comparing the outputs from the wave shaping circuit and a reference frequency oscillator as to their phases or frequencies and by smoothing the resultant difference or error signal for use as a control signal to provide the desired servo output voltage.

The above and other changes or modifications within the usual knowledge of the specialists are intended in the foregoing disclosure. It is therefore appropriate that the invention be construed broadly and in a manner consistent with the fair meaning or proper scope of the following claims.

What is claimed is:

1. In a magnetic tape cassette apparatus for use with a tape cassette of the type having a length of magnetic tape which extends between a pair of hubs within a housing for travel in both forward and reverse directions and which is partly exposed through a series of apertures formed in the front edge of the cassette housing, the apparatus including a magnetic head arranged for relative sliding contact with the tape through a centrally located one of the apertures in the cassette housing, a tape transport and speed control system comprising:

a variable speed motor for driving one of the cassette hubs;

another variable speed motor for driving the other cassette hub;

a speed sensing roller arranged for frictional contact with the tape through another of the apertures in the cassette housing which is located substantially closest to one of the cassette hubs which operates as the takeup hub during tape travel in the forward direction, whereby the speed sensing roller is held in proper frictional contact with the tape at least during forward tape travel for rotation at synchronous speed therewith;

speed sensor means driven by the speed sensing roller for generating an electrical output signal representative of actual tape speed;

servo circuit means for comparing the output signal of the speed sensor means with a reference signal and for producing a servo output signal corresponding to the difference therebetween;

switching means for causing the servo output signal to be applied to a takeup side of one of the motors during tape travel in either direction; and tape tension control circuit means for applying a controlled tape tension signal, derived from the servo output signal, to a supply side of one of the motors during tape travel in either direction in order to maintain constant tape tension.

2. The apparatus as defined in claim 1, wherein the tape tension control circuit means includes means for periodically varying the magnitude of the tape tension signal.

3. The apparatus as defined in claim 1, wherein the tape tension control circuit means includes means for making the magnitude of the tape tension signal greater during reverse tape travel than during forward tape travel.

4. The apparatus as defined in claim 1, further comprising braking circuit means responsive at least to a forward tape run stop command for braking a supply side of one of the motors.

5. The apparatus as defined in claim 4, further comprising speed reduction sensing circuit means becoming operative upon reduction of the tape speed to a predetermined degree to prevent the braking circuit means from braking the supply side motor.

6. In a magnetic tape cassette apparatus for use with a tape cassette of the type having a length of magnetic tape which extends between first and second hubs within a housing for travel in both forward and reverse directions and which is partly exposed through a series of apertures formed in the front edge of the cassette housing, a tape transport and speed control system comprising:

a first variable speed motor for driving the first cassette hub;

a second variable speed motor for driving the second cassette hub;

a speed sensing roller arranged for frictional contact with the tape through one of the apertures in the cassette housing which is located substantially closest to the second cassette hub;

speed sensor means driven by the speed sensing roller for generating an electrical output signal representative of actual tape speed;

servo circuit means for comparing the output signal of the speed sensor means with a reference signal and for producing a servo output signal corresponding to the difference therebetween;

a first switching transistor connected to the first motor for causing the servo output signal to be applied thereto in response to a reverse tape run start command;

a second switching transistor connected to the second motor for causing the servo output signal to be applied thereto in response to a forward tape run start command;

tape tension control circuit means connected to the servo circuit means for providing a tape tension signal substantially inversely proportional in magnitude to the servo output signal; and means connected between the tape tension control circuit means and the first and the second motors for causing the tape tension signal to be applied to a supply side of one of the motors during tape travel in either direction.

7. The apparatus as defined in claim 6, wherein the speed sensor means includes means for generating pulses at a recurrence rate representative of actual tape speed, and wherein the apparatus further comprises maximum setting circuit means for preventing the magnitude of the servo output signal from exceeding a preset maximum value, the maximum setting circuit means being responsive at least to a forward tape run stop command to permit the magnitude of the servo output signal to rise to the preset maximum value, and braking circuit means connected between the pulse generating means and the first switching transistor, the braking circuit means being responsive to the forward tape run stop command to cause intermittent conduction through the first switching transistor and hence to cause application of a braking signal of periodically varying magnitude to the first motor.

8. The apparatus as defined in claim 7, wherein the maximum setting circuit means is also responsive to a reverse tape run stop command to permit the magnitude of the servo output signal to rise to the preset maximum value, and wherein the apparatus further comprises second braking circuit means connected between the pulse generating means and the second switching transistor, the second braking circuit means being responsive to the reverse tape run stop command to cause intermittent conduction through the second switching transistor and hence to cause application of a braking signal of periodically varying magnitude to the second motor.

9. The apparatus as defined in claim 8, further comprising speed reduction sensing circuit means for preventing the first recited and the second braking circuit means from causing application of the braking signals when the actual tape speed is reduced to less than about 30 percent of normal tape speed.

10. The apparatus as defined in claim 9, wherein the tape tension control circuit means includes means responsive to the forward and reverse tape run stop commands to cause the first and the second motors to be energized in the opposite directions under the same conditions, whereby the tape when brought to a complete stop extends tautly between the first and the second cassette hubs.

11. In a magnetic tape cassette apparatus for use with a tape cassette of the type having a length of magnetic tape which extends between a pair of hubs within a housing for travel in both forward and reverse directions and which is partly exposed through a series of apertures formed in the front edge of the cassette housing, the apparatus including a magnetic head arranged for relative sliding contact with the tape through a centrally located one of the apertures in the cassette housing, a tape transport and speed control system comprising:

variable speed motor means for driving the cassette hubs, the speed of the motor means being determined by the magnitude of a control signal;

a speed sensing roller arranged for frictional contact with the tape through another of the apertures in the cassette housing which is located substantially closest to one of the cassette hubs which operates as the takeup hub during tape travel in the forward direction, the speed sensing roller has a moment of inertia in the range of from about 0.01 to about 0.50 g cm$^2$, whereby the speed sensing roller is maintained in proper frictional contact with the tape at least during forward tape travel for rotation at synchronous speed therewith;

speed sensor means driven by the speed sensing roller for generating an electrical output signal representative of actual tape speed; and servo circuit means for comparing the output signal of the speed sensor means with a reference signal and for delivering to the motor means the control signal corresponding to the difference therebetween.

12. The apparatus as defined in claim 11, further comprising feedback circuit means connected between the output and input of the servo circuit means, and feedback control circuit means for controlling the feedback circuit means so as to make the loop gain of the system less during reverse tape travel than during forward tape travel.

13. The apparatus as defined in claim 11, further comprising minimum setting circuit means connected between the output and input of the servo circuit means for preventing the magnitude of the control signal from becoming less than a preset value.

14. The apparatus as defined in claim 11, further comprising maximum setting circuit means connected between the output and input of the servo circuit means for preventing the magnitude of the control signal from becoming more than a preset value.

15. The apparatus as defined in claim 11, wherein the speed sensor means comprises a speed sensor for generating an output signal whose frequency represents the actual tape speed, a wave shaping circuit for modifying the output signal of the speed sensor into a corresponding pulse train, and a converter for converting the output pulses of the wave shaping circuit into a voltage representative of the actual tape speed, and wherein the servo circuit means comprises a differential amplifier for comparing the output voltage of the converter with the reference signal having a constant voltage.

16. In a magnetic tape cassette apparatus for use with a tape cassette of the type having a length of magnetic tape which extends between a pair of hubs within a housing for travel in both forward and reverse directions and which is partly exposed through a series of apertures formed in the front edge of the cassette housing, the apparatus including a magnetic head arranged for relative sliding contact with the tape through a centrally located one of the apertures in the cassette housing, a tape transport and speed control system comprising:

variable speed motor means for driving the cassette hubs, the speed of the motor being determined by the magnitude of a control signal;

a speed sensing roller arranged for frictional contact with the tape through another of the apertures in the cassette housing which is located substantially closest to one of the cassette hubs which operates as the takeup hub during tape travel in the forward direction, the speed sensing roller is mounted in such a position on the apparatus that the frictional contact between the roller and the tape within the cassette housing is established simply as the tape cassette is loaded into a predetermined position on the apparatus, whereby the speed sensing roller is maintained in proper frictional contact with the tape at least during forward tape travel for rotation at synchronous speed therewith;

speed sensor means driven by the speed sensing roller for generating an electrical output signal representative of actual tape speed; and servo circuit means for comparing the output signal of the speed sensor means with a reference signal and for delivering to the motor means the control signal corresponding to the difference therebetween.

* * * * *